US012607737B2

(12) United States Patent
John Wilson et al.

(10) Patent No.: US 12,607,737 B2
(45) Date of Patent: Apr. 21, 2026

(54) MACHINE LEARNING BASED OBJECT DETECTION USING RADAR INFORMATION

(71) Applicant: QUALCOMM Incorporated, San Diego, CA (US)

(72) Inventors: Makesh Pravin John Wilson, San Diego, CA (US); Radhika Dilip Gowaikar, San Diego, CA (US); Shantanu Chaisson Sanyal, San Diego, CA (US); Volodimir Slobodyanyuk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 18/057,642

(22) Filed: Nov. 21, 2022

(65) Prior Publication Data

US 2023/0213646 A1    Jul. 6, 2023

Related U.S. Application Data

(60) Provisional application No. 63/266,376, filed on Jan. 4, 2022.

(51) Int. Cl.
| | |
|---|---|
| *G01S 13/89* | (2006.01) |
| *G01S 13/58* | (2006.01) |

(Continued)

(52) U.S. Cl.
CPC .............. *G01S 13/89* (2013.01); *G01S 13/58* (2013.01); *G06V 10/25* (2022.01); *G06V 10/764* (2022.01); *G06V 10/82* (2022.01)

(58) Field of Classification Search
CPC ........ G01S 13/89; G01S 13/58; G01S 13/723; G01S 13/865; G01S 2013/9318;

(Continued)

(56) References Cited

U.S. PATENT DOCUMENTS

| | | |
|---|---|---|
| 2019/0130580 A1 | 5/2019 | Chen et al. |
| 2019/0258878 A1 | 8/2019 | Koivisto et al. |

(Continued)

OTHER PUBLICATIONS

K. Patel, K. Rambach, T. Visentin, D. Rusev, M. Pfeiffer and B. Yang, "Deep Learning-based Object Classification on Automotive Radar Spectra," 2019 IEEE Radar Conference (RadarConf), Boston, MA, USA, 2019, pp. 1-6 (Year: 2019).*

(Continued)

*Primary Examiner* — Robert W Hodge
*Assistant Examiner* — Bongani Jabulani Mashele
(74) *Attorney, Agent, or Firm* — QUALCOMM Incorporated

(57) ABSTRACT

Disclosed are systems, apparatuses, processes, and computer-readable media to implement a heterogenous biometric authentication process in a control system. A process includes obtaining radar information identifying measured properties of at least one object in an environment, generating pre-processed radar information for input into a neural network at least in part by processing the obtained radar information, generating an object detection output for the at least one object at least in part by detecting the at least one object using the neural network with the pre-processed radar information as input, and modifying, based on the obtained radar information, the object detection output for the at least one object.

26 Claims, 15 Drawing Sheets

(51) Int. Cl.

| | |
|---|---|
| *G06V 10/25* | (2022.01) |
| *G06V 10/764* | (2022.01) |
| *G06V 10/82* | (2022.01) |

(58) Field of Classification Search
CPC ......... G01S 2013/93185; G01S 13/867; G01S 7/417; G01S 13/931; G01S 2013/9319; G06V 10/25; G06V 10/764; G06V 10/82; G06V 20/58; G06V 2201/12
See application file for complete search history.

(56) References Cited

U.S. PATENT DOCUMENTS

| | | |
|---|---|---|
| 2020/0202144 A1 | 6/2020 | Porter et al. |
| 2021/0063578 A1* | 3/2021 | Wekel .................. G01S 17/894 |
| 2022/0120858 A1 | 4/2022 | Cennamo et al. |

OTHER PUBLICATIONS

F. Küppers, J. Kronenberger, A. Shantia and A. Haselhoff, "Multivariate Confidence Calibration for Object Detection," 2020 IEEE/CVF Conference on Computer Vision and Pattern Recognition Workshops (CVPRW), Seattle, WA, USA, 2020, pp. 1322-1330 (Year: 2020).*

Ouaknine ( A. Ouaknine, A. Newson, P. Perez, F. Tupin and J. Rebut, "Multi-View Radar Semantic Segmentation," in 2021 IEEE/CVF International Conference on Computer Vision (ICCV), Montreal, QC, Canada, 2021, pp. 15651-15660) (Year: 2021).*

International Search Report and Written Opinion—PCT/US2022/080361—ISA/EPO—May 24, 2023.

Partial International Search Report—PCT/US2022/080361—ISA/EPO—Mar. 30, 2023.

Patel K., et al., "Deep Learning-based Object Classification on Automotive Radar Spectra", 2019 IEEE Radar Conference (RadarConf), Apr. 22, 2019, XP033616809, 6 pages, DOI: 10.1109/RADAR.2019.8835775, p. 2, right-hand column, lines 15-44.

Patel K., et al., "Investigation of Uncertainty of Deep Learning-based Object Classification on Radar Spectra", 2021 IEEE Radar Conference, May 7, 2021, XP033925850, 6 pages, Abstract, table 1 p. 1, left-hand column, lines 18-21 p. 2, right-hand column, lines 1-11 p. 2, right-hand column, line 54—p. 3, left-hand column, line 3 p. 3, left-hand column, lines 44-49 p. 3, right-hand column, lines 5-17, 32-34.

Ouaknine A., et al., "Multi-View Radar Semantic Segmentation", IEEE/CVF International Conference on Computer Vision (ICCV), Montreal, QC, Canada, 2021, 15671-15680.

Ghahremani A., et al., "Cascaded CNN Method for Far Object Detection in Outdoor Surveillance", Proceedings—14th International Conference on Signal Image Technology and Internet Based Systems, Eindhoven University of Technology, 2018, 9 Pages.

* cited by examiner

100

300

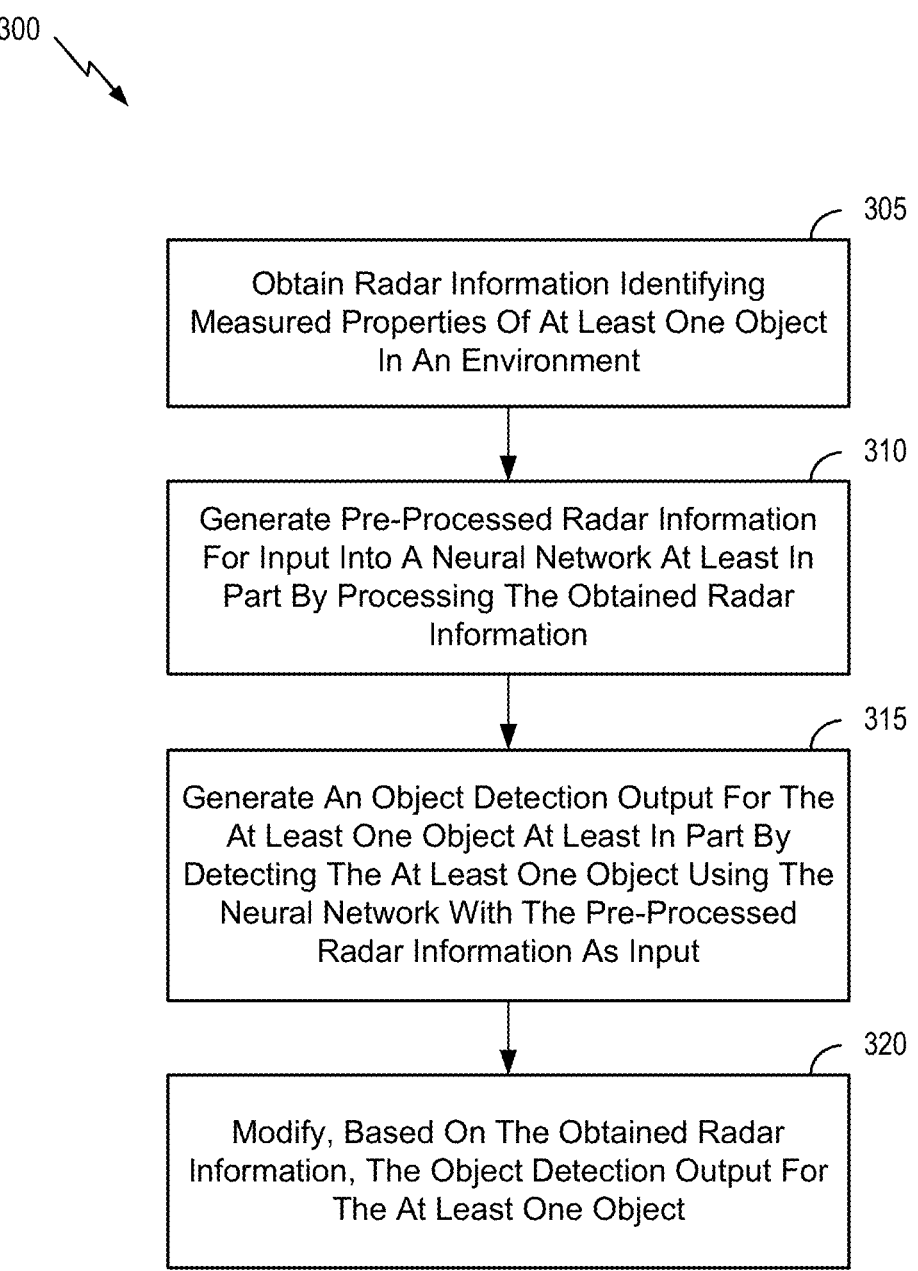

305

Obtain Radar Information Identifying Measured Properties Of At Least One Object In An Environment

310

Generate Pre-Processed Radar Information For Input Into A Neural Network At Least In Part By Processing The Obtained Radar Information

315

Generate An Object Detection Output For The At Least One Object At Least In Part By Detecting The At Least One Object Using The Neural Network With The Pre-Processed Radar Information As Input

320

Modify, Based On The Obtained Radar Information, The Object Detection Output For The At Least One Object

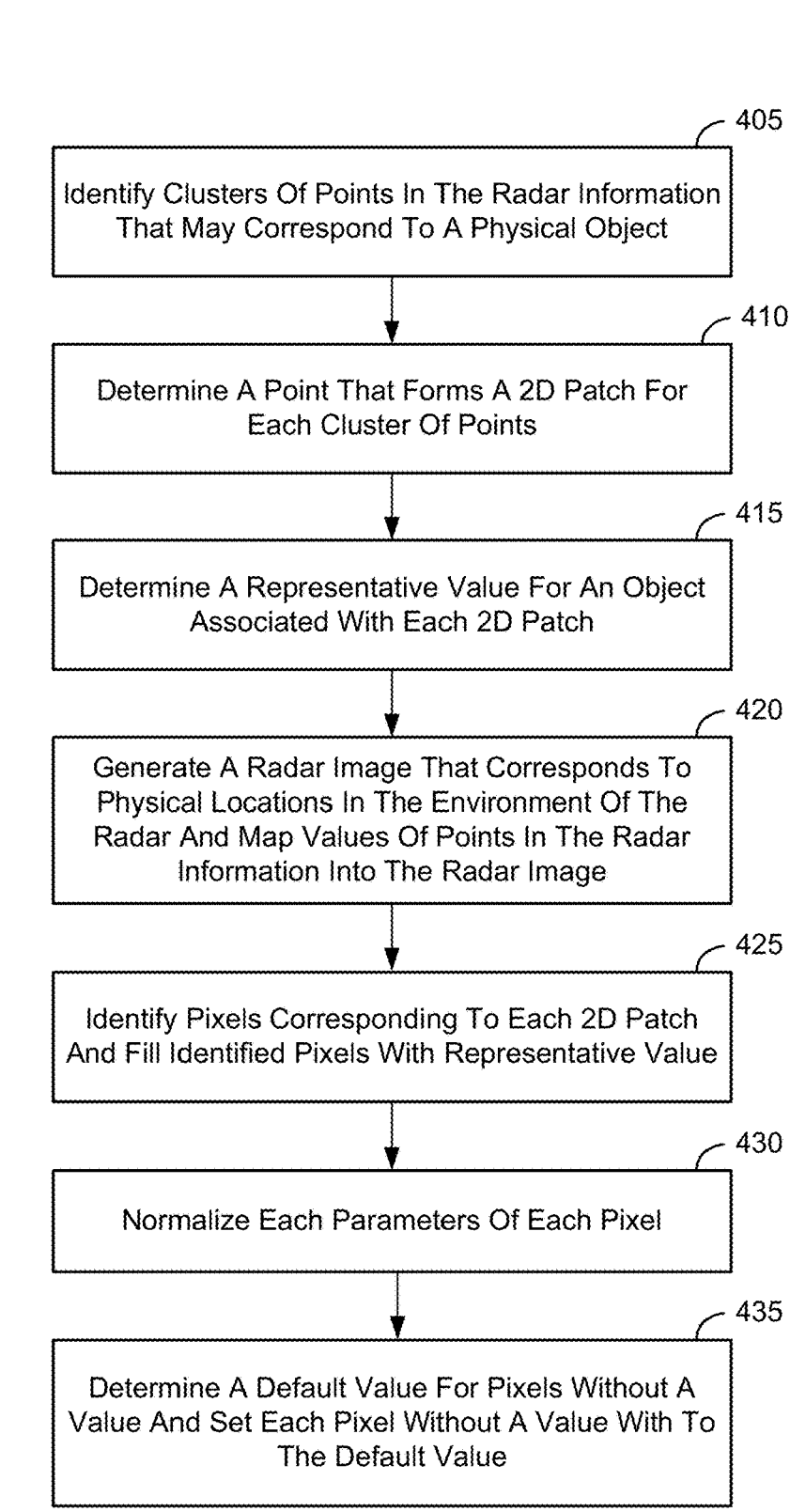

405

Identify Clusters Of Points In The Radar Information That May Correspond To A Physical Object

410

Determine A Point That Forms A 2D Patch For Each Cluster Of Points

415

Determine A Representative Value For An Object Associated With Each 2D Patch

420

Generate A Radar Image That Corresponds To Physical Locations In The Environment Of The Radar And Map Values Of Points In The Radar Information Into The Radar Image

425

Identify Pixels Corresponding To Each 2D Patch And Fill Identified Pixels With Representative Value

430

Normalize Each Parameters Of Each Pixel

435

Determine A Default Value For Pixels Without A Value And Set Each Pixel Without A Value With To The Default Value

FIG. 4

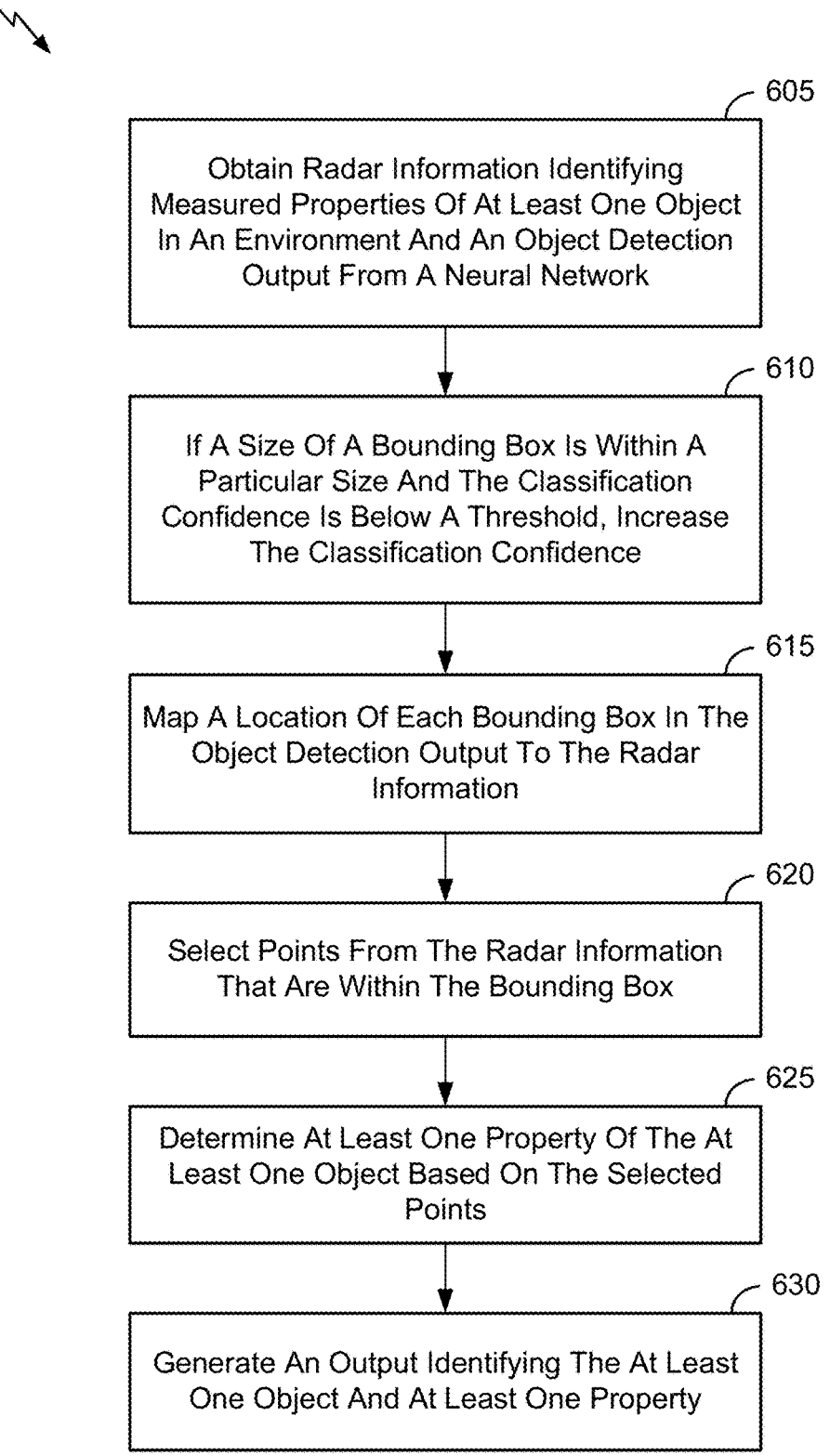

600

605

Obtain Radar Information Identifying Measured Properties Of At Least One Object In An Environment And An Object Detection Output From A Neural Network

610

If A Size Of A Bounding Box Is Within A Particular Size And The Classification Confidence Is Below A Threshold, Increase The Classification Confidence

615

Map A Location Of Each Bounding Box In The Object Detection Output To The Radar Information

620

Select Points From The Radar Information That Are Within The Bounding Box

625

Determine At Least One Property Of The At Least One Object Based On The Selected Points

630

Generate An Output Identifying The At Least One Object And At Least One Property

| SSD Head Output | → | GT-Default Distance Computation | → | Matching (e.g., Hungarian + 0.5 IOU Thresh.) | → | Conf. + Loc/Size Loss Comp. |

805          810          815

900

| SSD Head Output | → | Modified GT-Detects Dist. Comput. | → | Matching (e.g. Hungarian + 0.5 IOU Thresh.) | → | Conf. + Loc/Size Loss Comp. |

905          910          915

1200 loc : $\Delta(cx, cy, w, h)$
conf : $(c_1, c_2, \ldots, c_p)$ 4 x 4 Feature Map 8 x 8 Feature Map Image with GT Boxes

MACHINE LEARNING BASED OBJECT DETECTION USING RADAR INFORMATION

CROSS-REFERENCE TO RELATED APPLICATION

This application claims priority to provisional patent application U.S. Provisional Application No. 63/266,376, filed on Jan. 4, 2022, the content of which is incorporated by reference herein in its entirety.

FIELD

The present disclosure generally relates to a radar system. For example, aspects of the present disclosure relate to systems and techniques for deep learning based object detection using radar information.

BACKGROUND

Radar sensors and camera sensors are often employed on devices or systems, such as vehicles, mobile devices (e.g., a mobile telephone and/or mobile handset and/or so-called "smart phone" or other mobile device), among other devices and systems. Such radar and camera sensors can be used for many purposes. One example of using radar and camera sensors is for enhanced vehicle safety, such as adaptive cruise control (ACC), forward collision warning (FCW), collision mitigation or avoidance via autonomous braking, pre-crash functions such as airbag arming or pre-activation, and lane departure warning (LDW). Systems that employ both radar and camera sensors can provide a high level of active safety capability and are increasingly available on production vehicles.

SUMMARY

Systems and techniques are described herein that provide machine learning based object detection using radar information. For example, a system can use a machine learning system or model (e.g., a deep learning system such as a neural network) for improving object detection based on radar information. In one illustrative example, a process of detecting one or more objects is provided. The process includes: obtaining radar information identifying measured properties of at least one object in an environment; generating pre-processed radar information for input into a neural network at least in part by processing the obtained radar information; generating an object detection output for the at least one object at least in part by detecting the at least one object using the neural network with the pre-processed radar information as input; and modifying, based on the obtained radar information, the object detection output for the at least one object.

In another example, an apparatus for detecting objects is provided that includes a memory (e.g., configured to store data, such as virtual content data, one or more images, etc.) and one or more processors (e.g., implemented in circuitry) coupled to the memory. The one or more processors are configured to and can: obtain radar information identifying measured properties of at least one object in an environment; generate pre-processed radar information for input into a neural network at least in part by processing the obtained radar information; generate an object detection output for the at least one object at least in part by detecting the at least one object using the neural network with the pre-processed radar information as input; and modifying, based on the obtained radar information, the object detection output for the at least one object.

In another example, a non-transitory computer-readable medium is provided that has stored thereon instructions that, when executed by one or more processors, cause the one or more processors to: obtain radar information identifying measured properties of at least one object in an environment; generate pre-processed radar information for input into a neural network at least in part by processing the obtained radar information; generate an object detection output for the at least one object at least in part by detecting the at least one object using the neural network with the pre-processed radar information as input; and modifying, based on the obtained radar information, the object detection output for the at least one object.

In another example, an apparatus for detecting objects is provided. The apparatus includes: means for obtaining radar information identifying measured properties of at least one object in an environment; means for generating pre-processed radar information for input into a neural network at least in part by processing the obtained radar information; means for generating an object detection output for the at least one object at least in part by detecting the at least one object using the neural network with the pre-processed radar information as input; and modifying, based on the obtained radar information, the object detection output for the at least one object.

In some aspects, the radar information includes at least one point cloud from at least one radar.

In some aspects, the radar information includes at least one radar image.

In some aspects, each pixel of the at least one radar image includes at least one value of a property measured by the at least one radar.

In some aspects, one or more of the methods, apparatuses, and computer-readable medium described above further comprise: identifying a first set of points from the obtained radar information associated with the at least one object; and determining at least one point based on the first set of points, the first set of points and the at least one point forming a two-dimensional patch associated with the at least one object.

In some aspects, one or more of the methods, apparatuses, and computer-readable medium described above further comprise: determining a representative value for the at least one object; identifying a first set of pixels of the at least one radar image based on the two-dimensional patch associated with the at least one object; and setting a property of the first set of pixels to the representative value.

In some aspects, one or more of the methods, apparatuses, and computer-readable medium described above further comprise: normalizing a property of a first set of pixels in the at least one radar image.

In some aspects, one or more of the methods, apparatuses, and computer-readable medium described above further comprise: determining a minimum value associated with the property; determining a default value based on the minimum value associated with the property; identifying pixels that do not have a value; and setting the identified pixels to the default value.

In some aspects, the property comprises at least one of a radar cross section (RCS) value, a velocity, a yaw, or an acceleration.

In some aspects, the object detection output of the neural network comprises a bounding region that identifies a location of the at least one object.

In some aspects, one or more of the methods, apparatuses, and computer-readable medium described above further comprise: determining a size of the bounding region; and modifying a classification confidence of the object detection output for the at least one object based on the determined size of the bounding region.

In some aspects, modifying the classification confidence of the object detection output includes increasing the classification confidence based on the determined size being less than a threshold size.

In some aspects, one or more of the methods, apparatuses, and computer-readable medium described above further comprise: identifying a set of points in the obtained radar information based on the bounding region that identifies the location of the at least one object; and computing a representative property value for the at least one object based on measured property values of the set of points.

In some aspects, one or more of the methods, apparatuses, and computer-readable medium described above further comprise: outputting object information of the at least one object to another component to perform a function based on the object information, the object information including the representative property value.

In some aspects, the representative property value includes a mean value of the measured property values of the set of points.

In some aspects, the representative property value includes at least one of a median value or a trimmed mean of the measured property values of the set of points.

In some aspects, computing the representative property value comprises identifying a subset of points from the set of points and determining the representative property value from the subset of points.

In some aspects, one or more of the methods, apparatuses, and computer-readable medium described above further comprise: determining a yaw of the at least one object; selecting a subset of points from the set of points based on the yaw of the at least one object; and determining the representative property value from the subset of points.

In some aspects, one or more of the methods, apparatuses, and computer-readable medium described above further comprise: determining a velocity of the at least one object; selecting a subset of points from the set of points based on the velocity of the at least one object; and determining the representative property value from the subset of points.

In some aspects, the apparatus is, is part of, and/or includes a wearable device, an extended reality device (e.g., a virtual reality (VR) device, an augmented reality (AR) device, or a mixed reality (MR) device), a head-mounted display (HMD) device, a wireless communication device, a mobile device (e.g., a mobile telephone and/or mobile handset and/or so-called "smart phone" or other mobile device), a camera, a personal computer, a laptop computer, a server computer, a vehicle or a computing device or component of a vehicle, another device, or a combination thereof. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyroscopes, one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Illustrative aspects of the present application are described in detail below with reference to the following figures:

FIG. 3 is a flowchart illustrating an example of a process 300 implemented by a radar object detection system to detect objects in detected radar information, in accordance with some examples;

FIG. 4 is a flowchart illustrating an example of a process 400 implemented by a radar object detection system to generate pre-processed radar information for input into a neural network at least in part by processing the obtained radar information, in accordance with some examples;

FIG. 6 is a flowchart illustrating an example of a process implemented by a radar object detection system to modify the objection detection output from a neural network based on the obtained radar information, in accordance with some examples;

DETAILED DESCRIPTION

Figure 1:
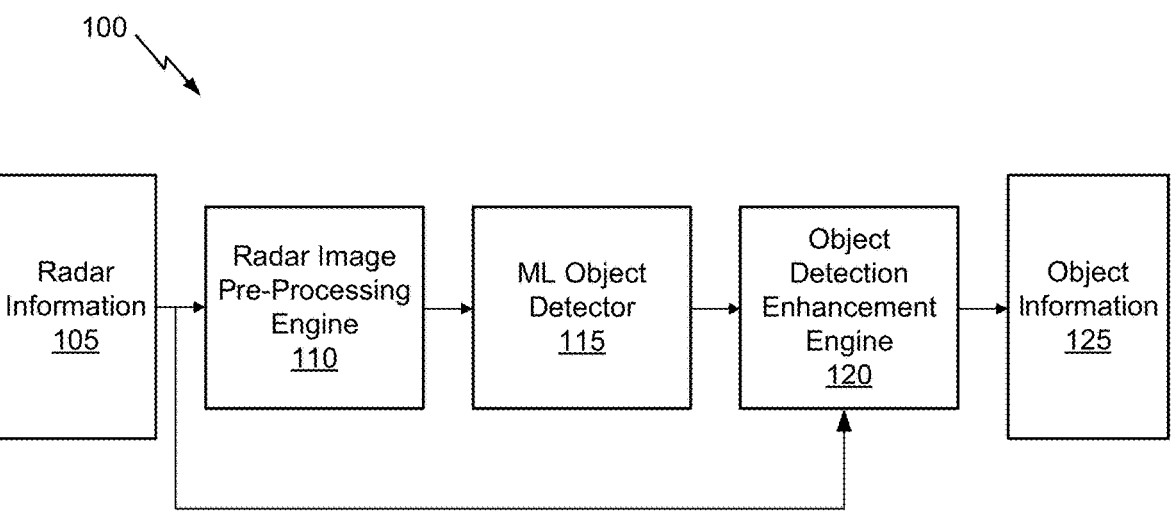
FIG. 1 illustrates a block diagram of a radar object detection system using a neural network to detect objects from radar information from a radar system, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the spirit and scope of the application as set forth in the appended claims.

As noted above, radar sensors and camera sensors can be employed by devices or systems (e.g., vehicles, mobile devices, extended realty systems, etc.) for various purposes. For example, vehicles may make use of radar and camera sensors for enhanced vehicle safety, such as adaptive cruise control (ACC), forward collision warning (FCW), collision mitigation or avoidance (e.g., via autonomous braking), pre-crash functions (e.g., airbag arming or pre-activation), lane departure warning (LDW), among others. For example, one or more camera sensors mounted on a vehicle can be used to capture images of an environment surrounding the vehicle (e.g., in front of the vehicle, behind the vehicle, and/or to the sides of the vehicle). A processor within the vehicle (e.g., a digital signal processor (DSP) or other processor) can attempt to identify objects within the captured images. Such objects may be other vehicles, pedestrians, road signs, objects within the road of travel, etc. Radar systems may also be used to detect objects along the road of travel of the vehicle. For example, a radar system can include one or more sensors that utilize electromagnetic waves to determine information related to the objects, such as the location or range, altitude, direction, and/or speed of the objects along the road.

A radar system includes one or more transmitters that transmit electromagnetic waves in the radio or microwaves domain toward objects in the environment surrounding the vehicle. The electromagnetic waves reflect off surfaces in the environment and one or more receivers of the radar system is configured to receive the reflections of the electromagnetic waves. The reflected signals are processed to provide the information related to the objects within the environment such as a location of the object and speed of the object.

A radar system can output frames at a specific interval such as 10 Hertz (Hz). The frames may be used to identify the objects in the environment. In some cases, the radar images may include a collection of points (e.g., a point cloud). For example, each point may indicate or represent a reflection of an electromagnetic signal from a potential object in the environment around the radar system.

Radar systems can output instantaneous data, tracked data, or a combination of instantaneous data and tracked data. Instantaneous data includes data that is identified by a reflected signal at one point in time and can include, for example, a location of the object, an signal to noise ration (SNR) of the signal, a radar cross section (RCS), etc. Radar systems can also track data (referred to as tracked data) by measuring the object at different times, such as by sending electromagnetic signals at two different times and identifying differences in the reflected signals. In some aspects, tracked data from a radar system can provide velocity, acceleration, yaw, and/or other information. In some cases, radar systems can provide object information such as length, width, and so forth.

Object detection systems and methods can be used to identify regions (e.g., in one or more images) that correspond to an object. Regions identified by an object detection system may be represented as a bounding region (e.g., a bounding box or another region) that fits around a perimeter of a detected object such as a vehicle. In some cases, a bounding region from the object detection system can be used by another component or system to perform a function based on a position of that bounding region. For example, a bounding region may be input into a vehicle blind spot detector to identify the presence of an object in a blind spot that the vehicle operator is unable to safely perceive.

An object detection system that is configured to detect objects in radar images may output erroneous detection results, such as due to output information from a radar system not being able to identify one or more edges of a particular object. For example, the transmitted electromagnetic waves from the radar system will not be incident on each surface of the object. Because each surface will not reflect the electromagnetic waves, the radar output will identify some, but not all, surfaces of the object. Further, objects in the environment can vary in size, which may affect the confidence of the object detection based on fewer points associated with smaller objects.

Systems, apparatuses, processes (or processes), and computer-readable media (referred to collectively as "systems and techniques") are described herein for performing machine learning based object detection using radar information. The radar information can include detected radar data (e.g., a point cloud) output from a radar system or can include one or more radar images. In some examples, the systems and techniques can generate a radar image based on detected radar data, such as a point cloud, output from a radar system. For instance, the systems and techniques can be map points from the detected radar data (e.g., from the point cloud) into a radar image, such as based on a quantization interval (e.g., an interval of 0.2 meters (m), 0.5 m, etc.). Each point of a radar image can include at least one parameter that is measured based on the reflected electromagnetic signal, such as a RCS, a velocity, a SNR, yaw, and so forth.

In some aspects, the systems and techniques can preprocess the radar information so that the information is in a format that can be efficiently processed by a machine learning based object detector (e.g., a neural network based object detector). In one example, the systems and techniques can detect two continuous edges of an object in the detected radar information (e.g., a point cloud or a radar image). The systems and techniques can determine a point that forms a two-dimensional (2D) patch based on the two continuous edges of the object. The systems and techniques may identify pixels in the detected radar information that correspond to the locations of the 2D patch and can fill in the identified pixels with one or more values. In some cases, the pixels in the detected radar information that are not associated with a point can be filled with a default value, such as zero or another value.

The systems and techniques can then input the pre-processed radar information into the machine learning based object detector. The machine learning based object detector can process the pre-processed radar information to identify one or more objects in an environment of the system. In some aspects, the systems and techniques can perform object detection enhancement to improve the object detection results based on the radar information. For example, the systems and techniques can compare the object detection results to the radar information to perform various enhancements, as described in more detail herein.

Further details of the systems and techniques are described below with respect to the figures. FIG. 1 illustrates a block diagram illustrating an example of a radar object detection system 100 for detecting objects from detected radar information 105, in accordance with some aspects. The radar object detection system 100 includes a radar image pre-processing engine 110, an machine-learning (ML) object detector 115, and an object detection enhancement engine 120. While the radar object detection system 100 is shown to include certain components, one of ordinary skill in the art will appreciate that the radar object detection system 100 can include more or fewer (and/or different) components than those shown in FIG. 1. For example, the radar object detection system 100 can include, in some instances, one or more memory devices (e.g., random access memory (RAM), read-only memory (ROM), cache, one or more buffers, and/or the like), one or more cameras, one or more sensors (e.g., radar sensors, inertial measurement units (IMUs), etc.), and/or any other hardware or processing devices (e.g., central processing units (CPUs), graphics processing units (GPUs), digital signal processors (DSPs), neural processing units (NPUs), etc.) that are not shown in FIG. 1. An illustrative example of a computing device and hardware components that can be implemented by the radar object detection system 100 is described below with respect to FIG. 15.

In some examples, the radar information 105 is output from a radar system that is separate from the radar object detection system 100. In some examples, the radar information 105 is detected by the radar object detection system 100. In some aspects, the detected radar information 105 may be a radar image (or frame) that includes a plurality of points (e.g., a point cloud), with each point indicating a signal reflected from that point and measurements of that point (e.g., location, velocity, SNR, RCS, etc.). In some cases, the radar image (or frame) may visually depict an intensity of electromagnetic reflections from objects in the environment. In some examples, the radar image (or frame) may include a list of objects including attributes for each object, such as intensity, SNR, length, width, yaw, etc. In some aspects, the detected radar information 105 may include multiple radar images (or frames).

The radar object detection system 100 may input the radar information 105 (e.g., a radar image or multiple radar images) into the radar image pre-processing engine 110. In some aspects, the radar image pre-processing engine 110 may be configured to pre-process the detected radar information.

mation 105 into pre-processed radar information (e.g., a pre-processed radar image or multiple pre-processed radar images) for input into the ML object detector 115. In some aspects, the radar image pre-processing engine 110 can pre-process the radar information 105 into pre-processed radar information based on the expected input for the ML object detector 115. For example, the radar image pre-processing engine 110 can quantize and map point cloud data from the detected radar information 105 into a pre-processed radar image with each pixel of the radar image representing a parameter or property. In some aspects, the radar image pre-processing engine 110 can identify pixels in the pre-processed radar image that are associated with a point in the point cloud from the detected radar information 105 and insert a value into each pixel based on at least one measured parameter or property from the radar image (e.g., a RCS, a velocity, an SNR, yaw, and so forth.). Pixels that are not associated with a point in the point cloud may include a default value that is determined by the radar image pre-processing engine 110.

In some examples, the detected radar information 105 can include one or more radar images (as noted above) and one or more bounding regions (e.g., a bounding box, a bounding ellipse, a bounding square, or other bounding region) that identify pixels in the one or more radar images that correspond to one or more objects. A bounding box will be used herein as an illustrative example of a bounding region. In some aspects, the radar image pre-processing engine 110 may improve the quality of the predictions provided by the object detector 115 by modifying the one or more radar images. For example, the radar image pre-processing engine 110 may identify points in a radar image that correspond to continuous edges of an object. After identifying points that correspond to continuous edges, the radar image pre-processing engine 110 may determine a point associated with the continuous edges that forms a two-dimensional (2D) patch within the radar image based on the continuous edges. In some aspects, the radar image pre-processing engine 110 may be configured to determine one or more points with the continuous edges that form a three-dimensional (3D) patch (e.g., associated with a 3D dataset such as a voxel) or other multi-dimensional patch. For example, the image pre-processing engine 110 may be configured to identify volumes associated with objects from 3D point cloud data from a light detection and ranging (LIDAR) sensor. The radar image pre-processing engine 110 may then modify the radar image based on the 2D patch. For example, the radar image pre-processing engine 110 may identify pixels within the 2D patch and fill each identified pixel with a value. In some aspects, the radar image pre-processing engine 110 may determine the value based on the detected radar information 105. In some cases, the radar image pre-processing engine 110 may determine a default value for pixels in the pre-processed radar image that do not include a measured property or parameter (e.g., SNR, RCS, etc.) and may insert the default value for each of the pixels that do not include a measured property or parameter. Further aspects of the radar image pre-processing engine 110 are described herein with reference to FIGS. 4, 5A, 5B, 5C, and 5D.

The pre-processed radar information (e.g., the one or more pre-processed radar images) are input into the ML object detector 115. The ML object detector 115 is a machine learning based (e.g., using one or more neural networks) object detector trained to perform specific tasks. In some aspects, the ML object detector 115 may be trained to identify regions from the pre-processed radar image data that correspond to one or more objects and to output object detection information representing the one or more objects. The object detection information may include a simply connected space that includes at plurality of points and a path between each point. In some aspects, a simply connected space may include a bounding region (e.g., a bounding box, a bounding ellipse, a bounding square, a closed polygon, or other bounding region) that forms a boundary representing an object detected by the ML object detector 115. A bounding box will be used herein as an illustrative example of a bounding region. In some aspects, the object detection information can additionally include a classification, such as a type of object, and a classification confidence that indicates the quality of the object classification.

The object detection enhancement engine 120 receives or obtains (e.g., from memory or directly from) the object detection information from the object detector 115 and the detected radar information 105 and determines object information 125. The object information 125 can include object detection results (e.g., bounding regions, classification information, classification confidence, etc.) and/or properties or attributes of detected objects. In some aspects, object detection enhancement engine 120 can process the object detection information from the object detector 115 and the detected radar information 105 to improve object detection results and/or make other enhancements. In some examples, the object detection enhancement engine 120 is configured to map a bounding region from the object detection information onto the detected radar information 105 (e.g., onto one or more radar images) to improve the object detection results, to improve measured properties of an object within a bounding region, and/or make other improvements. In one example, the object detection enhancement engine 120 can identify points in the detected radar information 105 that are within the bounding region and calculate a property of that object based on the identified points. In one example, the object detection enhancement engine 120 can filter out object detection results that do not correspond to any object identified in the radar information 105. Other enhancements can be performed as discussed herein.

In some aspects, the object detection enhancement engine 120 may generate and outputs object information 125 based on the properties of one or more objects to another function. In one illustrative example, the object detection enhancement engine 120 can provide the object information 125 for location-based functions. An example of a location-based function is a control system of an autonomous vehicle that uses the object information 125 to plan the movement of the autonomous vehicle in the environment of the radar system. An autonomous vehicle is an example of a device that may benefit from the enhanced object detection based on radar is disclosed herein, and the disclosed enhanced object detection process based on radar can be implemented in a variety of functions such as detecting objects beneath objects within other objects (e.g., surface or ground penetrating radar), for example. Further aspects of an object detection enhancement engine 120 are described herein with reference to FIGS. 6 and 7.

Figure 2:
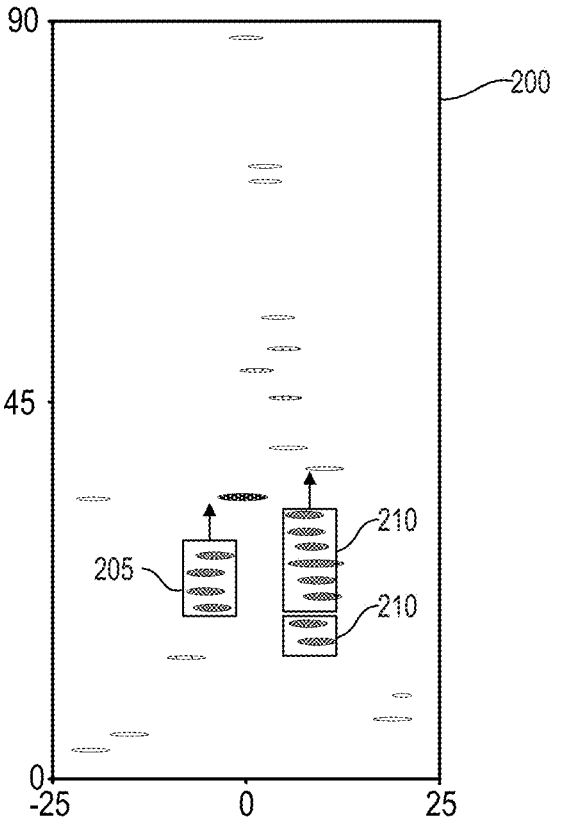
FIG. 2 is a diagram illustrating an example of a radar image representing output from a radar system that identifies potential objects in a surrounding environment of a radar system, in accordance with some examples.

FIG. 2 is a diagram illustrating an example of a radar image 200 representing output from a radar system that identifies potential objects in a surrounding environment of the radar system. The radar image 200 includes point cloud data that can be used to identify objects of interest in a physical environment surrounding the radar system. In some examples, the point cloud data is a collection of individual points within the environment that identify a measured parameter of objects within the environment. In the example of a radar fixed on a vehicle to perform object detection, the detected objects may include other vehicles, road signs, vegetation, building, pedestrians, and/or other objects. Each of these objects may be present within the radar image 200 and have an RCS value that identifies an intensity of the electromagnetic reflection that can be used to identify objects of interest. For example, different surfaces of objects may have a magnetic permeability and may absorb some of the electromagnetic waves to reduce the intensity of the reflection.

In some aspects, the radar image 200 includes a radar image that has been processed to group individual points. For example, the individual points of the radar image 200 can be grouped based on proximity into an elliptically shaped cluster of points to facilitate the identification of objects within the environment. Each elliptically shaped cluster of points identifies an RCS based on the fill, with a darker color indicating a higher intensity of reflection. Objects (e.g., vehicles, people, trees, buildings, or other objects) can be identified based on point clouds having a higher intensity of the reflection of the electromagnetic waves. In some aspects, the points in the radar image 200 identify a first object 205 (e.g., a first vehicle) based on four elliptical point clouds. The dimensions of the first object 205 can be determined based on the grouping of the elliptically shaped cluster of points.

In some aspects, a conventional object detection algorithm can identify the first object 205 as a single bounding box and can include a number of properties such as yaw and velocity used by other logic components to perform their function (write out other functions). Conventional object detection algorithms are imperfect and purely logic-based solutions and can identify regions incorrectly. For example, an object detection algorithm that uses the point cloud of the radar image 200 may identify a second object 210 (e.g., a second vehicle) that has larger dimensions (e.g., a box truck) as two separate bounding boxes that are adjacent to each other. In other examples, an object detection algorithm that uses the radar image 200 may identify a smaller object (e.g., a motorcycle) with a lower classification confidence because that smaller object will have fewer points in the radar image 200.

The radar object detection system 100 can provide improved object detection results as compared to conventional object detection algorithms. For example, as described above, the ML object detector 115 is a machine learning based object detector trained to perform specific tasks, such as to identify regions from the pre-processed radar image data that correspond to one or more objects and to output object detection information representing the one or more objects. The ML object detector 115 can implement "deep learning" techniques, such as ML or artificial intelligence (AI) methods based on learning data representations, as opposed to task-specific algorithms, which can perform specific functions that are difficult to implement using pure logic approaches. In some aspects, the ML object detector 115 can include a deep neural network (DNN), which is a type of artificial neural network (ANN) having multiple hidden layers between the input and output layer that can be trained to perform a specific function such as detecting, classifying, locating, and understanding objects in radar information 105 (e.g., a pre-processed version of the radar image 200), such as radar information output from the radar system. Specifically, a DNN performs mathematical operations in the hidden layers to calculate the probability of a particular output from a given input. For example, a DNN that is trained to recognize types of objects that may be encountered by an autonomous or semi-autonomous vehicle will analyze a given radar image and calculate the probability that each object detected in the frame is a vehicle, a pedestrian, a road sign, etc.

In some aspects, the ML object detector 115 can include a convolutional neural network (CNN). A CNN is a type of DNN and implements regularized versions of multilayer perceptrons, which are fully connected networks with each neuron in one layer being connected to all neurons in the next layer. In some aspects, a CNN performs well for vision-based tasks, but a CNN uses relatively little pre-processing compared to other image classification algorithms because a CNN learns to optimize the filters (or kernels) through automated learning (e.g., training).

An example of a neural network-based detector that can be implemented by the ML object detector 115 is a Cifar-10 detector trained to classify only certain objects, such as different types of vehicles. Further details of the Cifar-10 detector are described below with respect to FIG. 12. Additional examples of object detectors that can be implemented by the ML object detector 115 are described with respect to FIG. 13A-FIG. 13C and FIG. 14A-FIG. 13C.

FIG. 3 is a flowchart illustrating an example of a process 300 implemented by a radar object detection system (e.g., radar object detection system 100) to detect objects in detected radar information, in accordance with some examples. Although the example process 300 depicts a particular sequence of operations, the sequence may be altered without departing from the scope of the present disclosure. For example, some of the operations depicted may be performed in parallel or in a different sequence that does not materially affect the function of the process 300. In other examples, different components of an example device or system that implements the process 300 may perform functions at substantially the same time or in a specific sequence.

In some aspects, the process 300 may be performed by a detection system that identifies objects based on radar information (e.g., the radar object detection system 100). In some aspects, the process 300 may be performed by a system that uses a combination of radar and other information such as image information from camera sensors (e.g., infrared cameras), light detection and ranging (LIDAR), etc. In some aspects, the process 300 may pre-process (e.g., using the radar image pre-processing engine 110) the detected radar information (e.g., a point cloud or one or more radar images) into one or more images suitable for a neural network (e.g., of the ML object detector 115) to perform object detection.

At block 305, the process 300 includes obtaining (e.g., by the radar object detection system 100) detected radar information that identifies one or more measured properties of at least one object in an environment. In some aspects, the detected radar information can include a radar image that identifies reflections from objects in the environment surrounding the radar. In some aspects, the radar image may include cloud point data, such as that illustrated in FIG. 4 discussed below. Examples of radar information providing cloud point data are described herein with reference to FIG. 5A. In some aspects, the detected radar information can include a radar image or multiple radar images that visually depict(s) the parameters of the environment based on a color. Examples of radar images that can be included in the radar information from a radar system are described herein with reference to FIG. 2 and FIG. 5C.

At block 310, the radar object detection system may generate (e.g., using the radar image pre-processing engine 110) pre-processed radar information for input into a neural network (e.g., of the ML object detector 115) at least in part by processing the obtained radar information. In some aspects, the obtained radar information may include point cloud information and the processing of the obtained radar information may include generating a radar image (e.g., a bitmap) that corresponds to 2D locations in the radar image. The processing of the obtained radar information may include identifying points in the point cloud data and mapping measured values of the points into a pixel of the radar image. In some aspects, the processing of the obtained radar information may include identifying points in the cloud point data that form two continuous edges and determining a point from the identified points that form a 2D patch in the radar image. After identifying the point that forms the 2D patch, processing of the obtained radar information may include identifying pixels in the radar image within the 2D patch and filling the identified pixels based on measured values in the detected radar information.

As noted above, in some examples, the detected radar information may include a radar image (or multiple radar images) that visually depicts the parameters of the environment based on a color. In such an example, the processing of the obtained radar information may include extracting measurement information from the radar image (e.g., a bitmap) that corresponds to 2D locations in the radar image and each pixel may include one or more measured parameters. In some aspects, points in the radar image can be identified that form two continuous edges and the radar image can be pre-processed to form and fill the 2D patch as described above. In some aspects, the generating of the pre-processed radar information is further described herein with reference to FIGS. 4, 5A, 5B, 5C, and 5D.

At block 315, the radar object detection system may generate an object detection output for at least one object in the radar image. In some aspects, the object detection output can be a bounding region that can be mapped to the obtained radar information. In some aspects, the process 300 can use a neural network such as an ML object detector (e.g., the ML object detector 115) to detect the at least one object based on the radar image. In one illustrative example, the pre-processing of the obtained radar information at block 310 improves the quality of the predictions by the ML object detector and object classification confidence.

At block 320, the process 300 may include modifying, based on the obtained radar information, the object detection output for the at least one object. In some aspects, modifying the object detection output may include increasing a classification confidence of different types of objects. For example, some types of objects have a lower classification confidence due to fewer points of data in the detected radar information. In some cases, classification confidence of objects can be compared to other objects and, based on the object having a different size (e.g., based on a determined size of an object being less than a threshold size), the classification confidence can be increased based on a fixed threshold or a comparison to classification confidence of other objects. In some aspects, calculating, based on the detected radar information and the object detection output, parameters of the at least one object is further described herein with reference to FIGS. 6 through 7.

In some aspects, modifying the object detection output may include filtering or removing bounding regions and other object detection data (e.g., classification, classification confidence, etc.) for objects detected at block 315. For example, the process 300 may remove a bounding region and other object detection data for that bounding region if the bounding region, after being mapped to the obtained radar information, does not correspond to any points in the radar information that include parameters or attributes (e.g., SNR, RCS, velocity, acceleration, yaw, etc.).

In some examples, modifying the object detection output may include calculating, based on the detected radar information and the object detection output, parameters of the at least one object. As noted above, in some aspects, the object detection output can be a bounding region that can be mapped to the obtained radar information. Points from the detected radar information can be selected based on the bounding region. In some aspects, calculating a parameter or a property for the object (e.g., velocity, yaw, etc.) can include determining parameters or properties (or representative parameters or properties, such as an average or mean, maximum, a median, a trimmed mean, or any combination or variation thereof), of selected points from the detected radar information (e.g., points that are within the bounding region for the at least one object). A trimmed mean can include discarding or ignoring a certain percentile, such as a top 5 percentile and bottom 5 percentile, and computing the mean of the remaining values.

FIG. 4 is a flowchart illustrating an example of a process 400 implemented by a radar object detection system to generate pre-processed radar information for input into a neural network at least in part by processing the detected radar information, in accordance with some examples. Although the example process 400 depicts a particular sequence of operations, the sequence may be altered without departing from the scope of the present disclosure. For example, some of the operations depicted may be performed in parallel or in a different sequence that does not materially affect the function of the process 400. In other examples, different components of an example device or system that implements the process 400 may perform functions at substantially the same time or in a specific sequence.

In some aspects, process 400 may be performed by a radar image pre-processing engine (e.g., the radar image pre-processing engine 110) that converts the output radar information into a radar image suitable for a neural network to perform object detection. The radar image pre-processing engine may be implemented in hardware, software, or a combination of hardware and software. In some aspects, the radar image pre-processing engine performs an initial assessment of points by identifying clusters of points in the detected radar information that may correspond to an object at block 405. For example, radar image pre-processing engine may receive the detected radar information (e.g., the radar images including point cloud data) from a radar system and may identify clusters of points in the detected radar information. In some aspects, the detected radar information from a radar system may include a radar image and cluster of pixels in the radar image are detected. The assessment may use various aspects to remove potential false positives, such as the dimensions of the cluster being too large or too small, a large distribution of RCS values of corresponding points, and so forth. An illustration of identifying clusters of points in the detected radar information is further described herein with reference to FIG. 5A.

After identifying clusters that may correspond to an object, the radar image pre-processing engine determines a point that forms a 2D patch for each cluster of points at block 410. In some aspects, the points in the detected radar information correspond to one or more edges of an object. However, electromagnetic waves from the radar system may not be incident to each surface of the object and the points in the detected radar information may depict some edges of the object. In some aspects, the radar image pre-processing engine may identify a plurality of points, which correspond to edges of the object and determine a point that forms a 2D region associated with the object, which is also referred to as a 2D patch. An illustration of determining a point to form the 2D patch is further described herein with reference to FIG. 5B.

After forming the 2D patches, the radar image pre-processing engine determines a representative value for each property (e.g., a velocity, a yaw) of an object at block 415. In some aspects, the points associated within the cluster may have different values of a parameter that must be reconciled, such as two different points within the 2D patch that have a different velocity. Different values can affect the quality of the prediction of a neural network and the radar image pre-processing engine may determine a single value for every distinct property (e.g., yaw, velocity, etc.) for the object. For example, the radar image pre-processing engine may determine a velocity to be associated with all pixels of the 2D patch based on a mean of all pixels within the 2D patch. In some examples, the radar image pre-processing engine may determine a single parameter based on a median, a range function, a standard deviation, a trimmed mean, or any other suitable computation.

At block 420, the radar image pre-processing engine is configured to generate a radar image (e.g., a bitmap or a matrix) that corresponds to physical locations in the environment of the radar. The radar image pre-processing engine then maps values of points in the detected radar information to a corresponding pixel (or cell) based on quantizing each point. For example, each pixel may represent a distinct 0.2 m×0.2 m square, and points of the detected radar information that are measured by the radar system are mapped to a corresponding pixel in the bitmap. For example, Table 1 below illustrates various points from a radar image that mapped to a 5×5 matrix, corresponding to a square meter in the 0.2 m×0.2 m quantization grid. An illustration of generating a radar image is further described herein with reference to FIG. 5D.

TABLE 1

| | | | | |
|---|---|---|---|---|
| {<br>res: 60,<br>yaw: 0<br>} | | | | |
| | | {<br>res: 40,<br>yaw: −0.1<br>} | | |
| {<br>res: 30,<br>yaw: 0.1<br>} | | | | |
| {<br>res: 60,<br>yaw: −0.1<br>} | | | {<br>res: 40,<br>yaw: 0<br>} | |
| {<br>res: 70,<br>yaw: 0<br>} | {<br>res: 60,<br>yaw: 0.1<br>} | {<br>res: 50,<br>yaw: 0.1<br>} | | {<br>res: 70,<br>yaw: 0<br>} |

In the example illustrated in Table 1, a value of each pixel can be an object that corresponds to the measured properties or parameters of the object parameters (e.g., RCS and yaw) from the point cloud, and pixels that are not associated with a point or a 2D patch are not filled and may have a null or undefined value. In other aspects, the values of the object that identify measured properties or parameters of the object can include more information such as SNR, velocity, acceleration, and so forth, or can include different information.

After generating the radar image, at block 425 the radar image pre-processing engine identifies pixels in the image that correspond to the 2D patch and sets the identified pixels with the representative value, which was determined at block 415. In some aspects, block 425 fills each pixel within the 2D patch with the representative value because the pixels correspond to a single object. An illustration of identifying and setting pixels that correspond to the 2D patch is further described herein with reference to FIG. 5D.

In some aspects, the pixels having a value (e.g., pixels not having a null or undefined value) can be normalized to a minimum value (e.g., 0 or −1) and a maximum value (e.g., 1) to more clearly identify the relationships of the points at block 430. Equation 2 illustrates the radar image depicted in Equation 1 with normalized values.

TABLE 2

```
{
  res: 0.75,
  yaw: 0
}
                    {
                      res: 0.25,
                      yaw: −0.1
                    }
{
  res: 0.0,
  yaw: 0.1
}
{                                    {
  res: 0.75,                           res: 0.50,
  yaw: −0.1                            yaw: 0
}                                    }
{              {            {                        {
  res: 1.0,      res: 0.75,   res: 0.50,               res: 1.0,
  yaw: 0         yaw: 0.1     yaw: 0.1                 yaw: 0
}              }            }                        }
```

In some aspects, the radar image pre-processing engine determines a default value for pixels without a value and sets each pixel without a value to the default value at block 435. The empty values are set to a default value because a null or an undefined value can confuse the neural network. In some cases, the neural network is expecting a value at each pixel to determine relationships and perform calculations to identify regions in the radar image and null or undefined values. In some aspects, the default value can be a minimum value or a value that is below a minimum value of points in the radar image. For example, if points in the radar image have an RCS value from 20 to 70, the default RCS value could be 10. In some aspects, one or more parameters from Table 1 are set based on a default value as illustrated in Table 3 below.

TABLE 3

```
{              {            {            {            {
  res: 60,       res: 10,     res: 10,     res: 10,     res: 10,
  yaw: 0         yaw: 0       yaw: 0       yaw: 0       yaw: 0
}              }            }            }            }
{              {            {            {            {
  res: 10,       res: 10,     res: 40,     res: 10,     res: 10,
  yaw: 0         yaw: 0       yaw: −0.1    yaw: 0       yaw: 0
}              }            }            }            }
{              {            {            {            {
  res: 30,       res: 10,     res: 10,     res: 10,     res: 10,
  yaw: 0.1       yaw: 0       yaw: 0       yaw: 0       yaw: 0
}              }            }            }            }
{              {            {            {            {
  res: 60,       res: 10,     res: 10,     res: 40,     res: 10,
  yaw: −0.1      yaw: 0       yaw: 0       yaw: 0       yaw: 0
}              }            }            }            }
```

TABLE 3-continued

```
{              {            {            {            {
  res: 70,       res: 60,     res: 50,     res: 10,     res: 70,
  yaw: 0         yaw: 0.1     yaw: 0.1     yaw: 0       yaw: 0
}              }            }            }            }
```

Figures 5A, 5B:
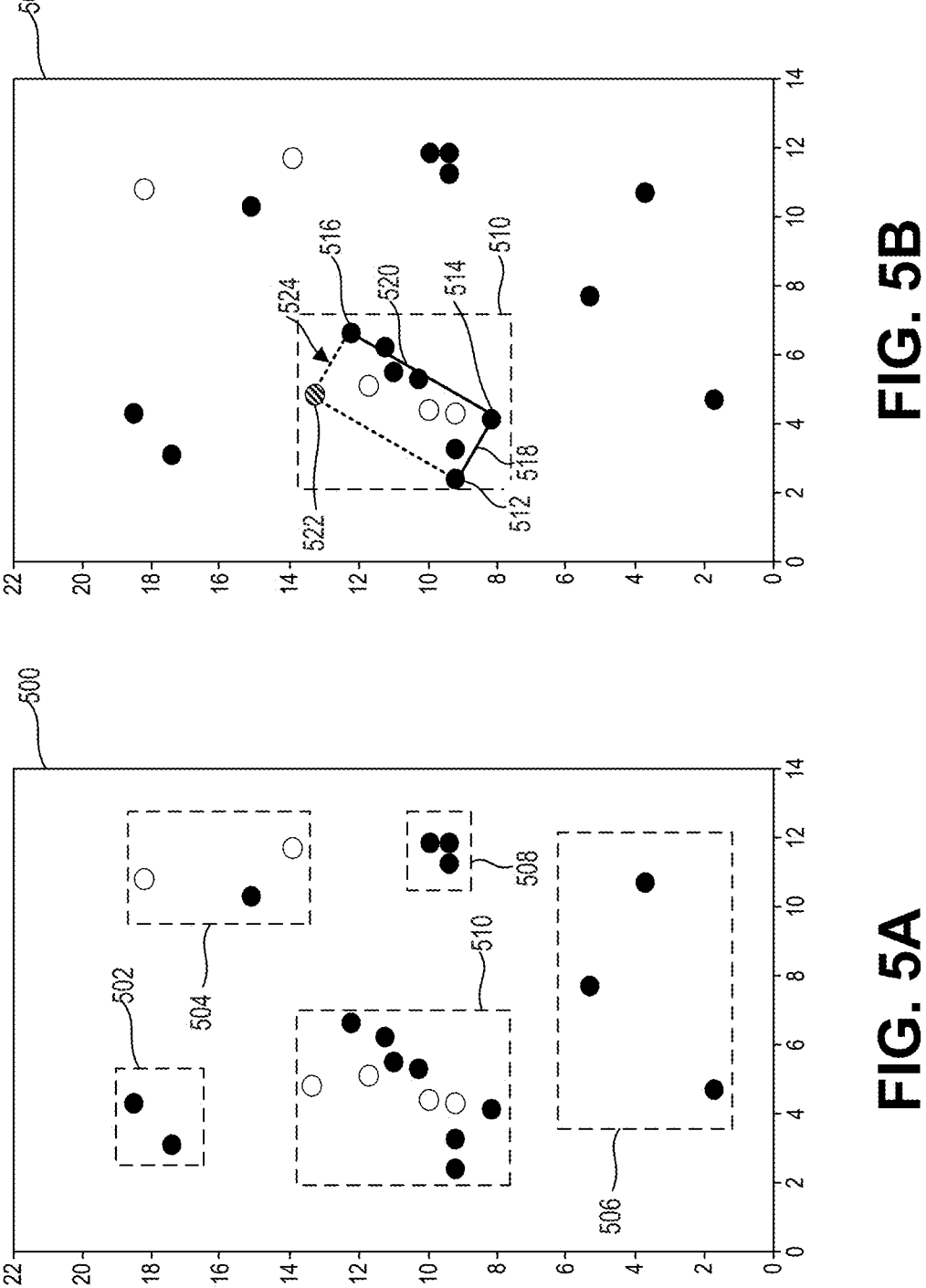
FIG. 5A is an illustration of a radar image and points associated with that radar image that identify potential objects in an environment, in accordance with some examples.
FIG. 5B is an illustration of determining a two-dimensional (2D) patch that corresponds to an object in the radar image, in accordance with some examples.

FIG. 5A is an illustration of detected radar information, such as a radar image, and points that identify potential objects in the environment, in accordance with some examples. In some aspects, a radar object detection system may include a radar image pre-processing engine to process the detected radar information prior to providing the information to a neural network configured to detect objects from the radar information. The radar image pre-processing engine may be configured to cluster different points in the radar image into nearby groups based on proximity and distance to create cluster 502, cluster 504, cluster 506, cluster 508, and cluster 510.

After forming the various clusters, the radar image pre-processing engine may identify clusters that do not correspond to an object in the environment based on logical groupings such as an edge of potential objects in the environment, dimensions of the potential object, or measured values of the potential object. For example, cluster 502 includes two points with strongly reflected signals that are relatively close together. In some cases, the radar image pre-processing engine cannot ascertain a shape from the two points and cluster 502 can be removed. In some aspects, another sensor may be used to detect objects (e.g., an image sensor) and the two points may be sufficient to identify an object when combined with data from that other sensor.

The radar image pre-processing engine may determine that the cluster 502 includes three points that may form a shape but two of the points have weakly reflected signals that indicate cluster 502 does not correspond to an object. The radar image pre-processing engine may determine that the cluster 506 also includes three points having strongly reflected signals, but a distance each point is significant and indicates that these points are not related.

The radar image pre-processing engine may determine that the cluster 508 also has three points with strongly reflected signals that are close to each other and may correspond to a small object. However, the radar image pre-processing engine may determine that the measured property (e.g., velocity) of the points in the cluster 508 indicate that the points are stationary and therefore, the radar image pre-processing engine may determine that the cluster 508 can be removed. In some aspects, The radar image pre-processing engine may determine that the cluster 510 includes a combination of strongly reflected signals and weakly reflected signals and can be determined to correspond to an object based on two continuous edges that can be identified.

FIG. 5B is an illustration of determining a 2D patch that corresponds to an object in the radar image, in accordance with some examples. The radar image pre-processing engine may identify a plurality of points such as points 512, 514, and 516 that correspond to at least two edges of an object. In the example illustrated in FIG. 5B, the radar image pre-processing engine may determine that points 512 and 514 form a first edge 518 and points 514 and 516 form a second edge 520. In some aspects, the radar image pre-processing engine may determine that the first edge 518 and the second edge are perpendicular. Based on the locations of points 512, 514, and 516, the radar image pre-processing engine may determine a point 522 that forms a 2D patch 524 that corresponds to a shape of an object (e.g., a vehicle).

Although the example in FIG. 5B illustrates a 2D patch 524 having a rectangular shape, the radar image pre-processing engine may detect any suitable shape such as a triangle, trapezoid, a closed polygon, or a non-linear shape such as an ellipse. In some aspects, the points within or bordering the 2D patch 524 can be used to determine a representative value of a measured property of the object (e.g., velocity, RCS, etc.)

Figure 5D:
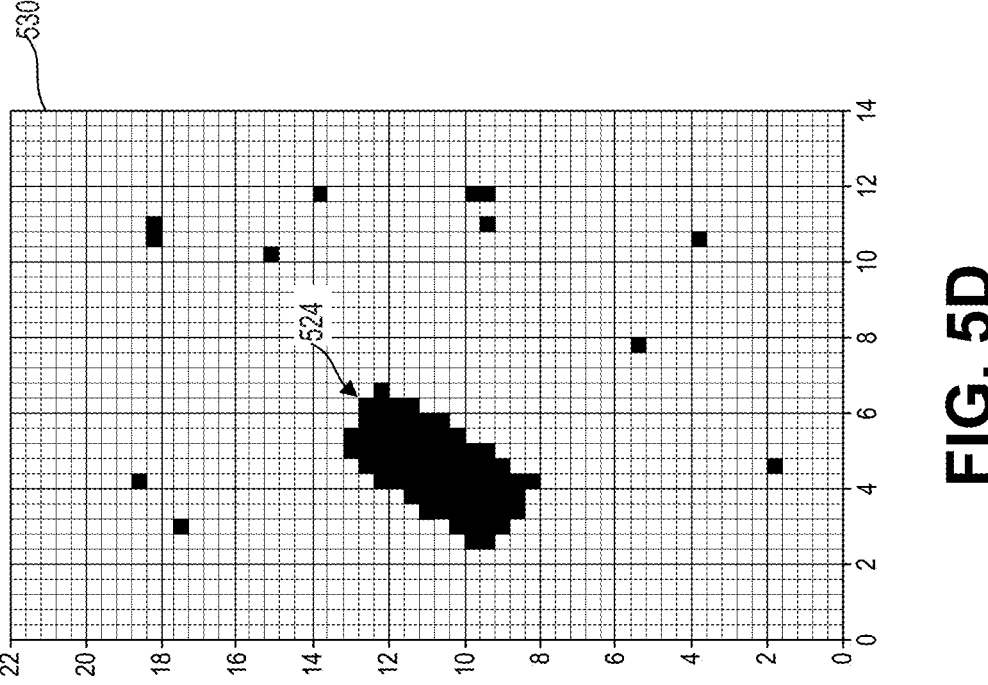
FIG. 5D is an illustration of a radar image after filling pixels based on a 2D patch, in accordance with some examples.
Figure 5C:
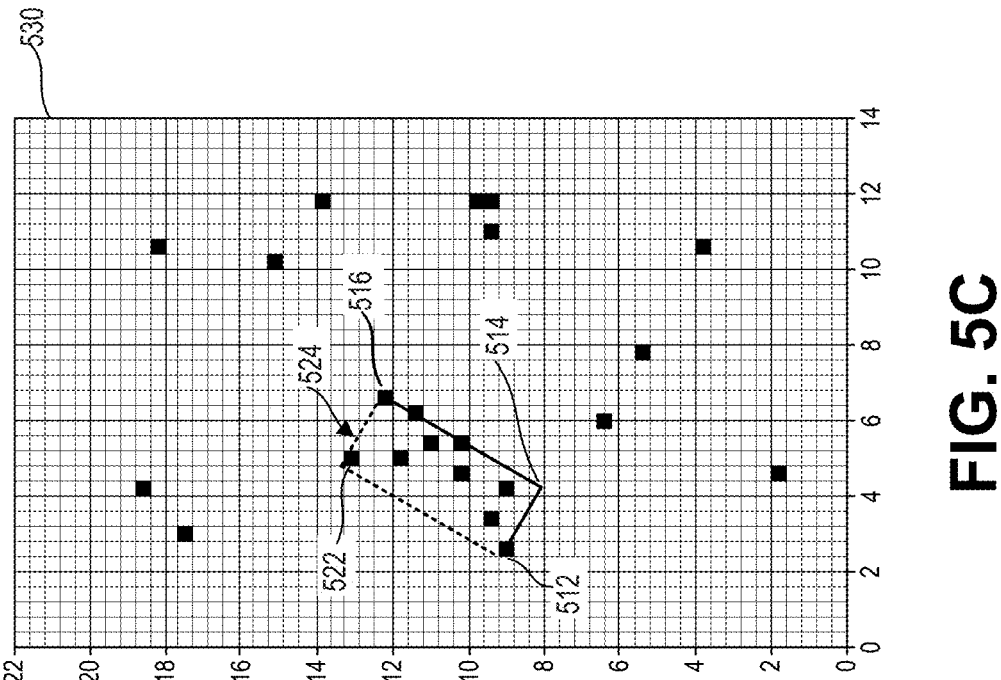
FIG. 5C is an illustration of a radar image generated from the detected radar information and mapping points in the detected radar information to pixels in the radar image, in accordance with some examples.

FIG. 5C is an illustration of a radar image 530 generated by a radar image pre-processing engine from the detected radar information 500 and mapping points in the radar information 500 to pixels in the radar image 530, in accordance with some examples. In some aspects, a radar image 530 is created by dividing 2D locations into regular intervals into an image having a resolution (e.g., quantization). For example, FIG. 5C illustrates a radar image having a width of 14 m and a length of 22 m for illustrative purposes, and the locations are divided into an image (e.g., a bitmap) having a 0.4 m interval to generate an image with a resolution of 55 pixels×35 pixels.

Based on the image resolution, the points associated with the radar image, such as points 512, 514, 514, and 522, are mapped to a corresponding pixel and the pixel is filled with the measured parameters from the detected radar information. FIG. 5C illustrates that pixels in the radar image 530 are filled with a solid to illustrate that the pixel has a measured parameter (e.g., a value) and unfilled pixels are filled with a default value. In some aspects, each filled pixel may have a different value.

In some aspects, a radar image can be provided in the detected radar information from the radar system. The radar image can be processed in connection for input into an object detector (e.g., ML object detector 115). For example, the radar image can have a high resolution and points that identify potential objects in the high resolution image can be identified and then mapped into a lower resolution image for input into an object detector. In some aspects, the detected radar information can include other information such as a legend that maps values of properties and the other information can be mapped into the lower resolution image for input into an object detector.

FIG. 5D is an illustration of a radar image 530 after filling pixels within the 2D patch 524, in accordance with some examples. In some aspects described above, the radar image pre-processing engine identifies three points that form two continuous edges of an object and fills a region associated with the identified three points with a measured property. By filling each pixel in the 2D patch 524 with the representative value, the neural network more identifies objects in the radar image with a greater accuracy. Although the objects are easily identified in FIG. 5D, a radar image may encompass a larger environment with many more potential objects, which can increase the complexity of the object detection processes. In some aspects, the object detector can identify objects in pre-processing the radar image with greater accuracy. In some cases, the pre-processing of the radar image can also improve the object detection accuracy, may reduce the complexity of the neural network, and may simplify the training process. An example of training a neural network is further described herein with reference to FIG. 10.

FIG. 6 is a flowchart illustrating an example of a process 600 implemented by an object detection enhancement engine to modify the objection detection output from a neural network based on the obtained radar information, in accordance with some examples. Although the example process 600 depicts a particular sequence of operations, the sequence may be altered without departing from the scope of the present disclosure. For example, some of the operations depicted may be performed in parallel or in a different sequence that does not materially affect the function of the process 600. In other examples, different components of an example device or system that implements the process 600 may perform functions at substantially the same time or in a specific sequence.

In some aspects, the process 600 may be implemented by an instrument, a device, or a module, such as the object detection enhancement engine 120, of an object detection system to calculate parameters of the object. In some aspects, the object detection enhancement engine may receive the detected radar information from the radar system and object detection information from the object detector and calculate a velocity and a yaw of the object.

In some aspects, at block 605, the process 600 obtains (e.g., by an object detection enhancement engine) radar information identifying measured properties of at least one object in an environment and an object detection output from a neural network (e.g., the object detector 115). The object detection information that is output from the neural network identifies various objects by creating a bounding region over each region in the input image that corresponds to an object. In some aspects, the output of a neural network trained for object detection is a bounding box is aligned with axes on the input radar image to identify a rectangular region associated with the object. In some aspects, the bounding region can be any suitable shape (e.g., an elliptical region, a closed polygon, etc.). A bounding region is further described herein with reference to FIG. 7.

At block 610, the object detection enhancement engine determines if a size of a bounding region is within a particular size and the classification confidence is below a threshold. The bounding region can represent an uncommonly sized object that is smaller than more common objects and would have few corresponding points in the radar image based on its smaller size. For example, a motorcycle would have fewer corresponding points in the radar image, and a bounding region would be smaller. The classification confidence of the object detection of the smaller object may be smaller (e.g., 30%) as compared to other common objects (e.g., 70%) because there are fewer points available to the neural network for object detection. In some cases, the object detection enhancement engine may increase the classification confidence of the bounding region that corresponds to the smaller object by a threshold (e.g., 20%, 30%, etc.). In some examples, the threshold can be increased based on a difference between the lower confidence of the smaller object and a higher confidence of larger objects (e.g., cars).

At block 615, the object detection enhancement engine may map a location of each bounding region in the object detection output to the detected radar information. In some aspects, the location of the bounding region is mapped to the locations in the detected radar information. At block 620, the object detection enhancement engine selects each point from the detected radar information that is within the mapped location of the bounding region. An example of mapping the location to the bounding region to the detected radar information is further described herein with reference to FIG. 7.

At block 625, the object detection enhancement engine determines at least one property of the at least one object within the bounding region based on the selected points in the detected radar information. In some aspects, a property of the at least one object is determined based on a mathematical or logical of that property from the selected points in the detected radar information. For example, the object detection enhancement engine can determine a mean value, a median value, a trimmed mean value, or other value for a velocity based on a velocity at each point. In some other aspects, the object detection enhancement engine can select a portion of the points based on a function such as the highest 20% of values and then average the portion of points.

After determining the property, the object detection enhancement engine can generate an output object information (e.g., object information 125). In some aspects, the object detection enhancement engine can generate output object information to identify the at least one object and the at least one determined property at block 630. For example, the object detection enhancement engine can generate any suitable information for input into a component that receives the detected radar information for use. For example, an autonomous vehicle control system can receive the output object information as part of a planning cycle, which operates at a frequency of 10 Hz or every 100 ms, to determine parameters to navigate the environment. In this example, the object detector engine may generate object detection information at a different rate (e.g., every 50 ms) and the object detection enhancement engine may curate the output object information to synchronize with the autonomous vehicle control system (e.g, every 100 ms). For example, the planning cycle can cause the autonomous vehicle to change lanes, slow down due to a vehicle ahead, turn to follow the road, and so forth. An example of an output object information from object detection enhancement engine is provided below in Table 4.

TABLE 4

```
{
    "location": {
        "x": "4.324937910",
        "y": "1.248866891"
    }
    "properties": {
        "length": "22.25",
        "width": "2.56"
        "rcs": "0.84",
        "yaw": "-0.0012",
        "velocity": "94.41590",
        "snr": "-87.345"
    },
    "objectVariant": {
        "category": "heavyVehicle"
        "classificationConfidence": "0.74",
        "estimatedResponseTimeInMs": "0.9",
        "noiseFactor": "0.01",
    }
    "timestamp": "2021-12-22T18:56:52+0893"
}
```

The output object information in Table 4 indicates a single object with various information such as the center point of the object, length, width, velocity, object category. The example output object information is provided for illustrative purposes only and can include more or less information, as well as information about other vehicles and other potential objects (e.g., vegetation, fixed structures such as signs, etc.).

Figure 7:
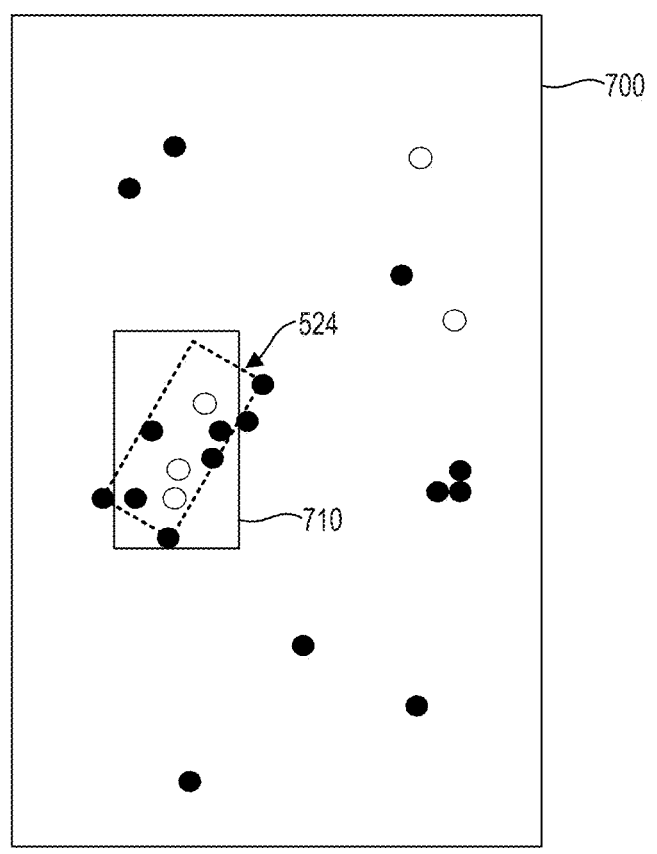
FIG. 7 illustrates a bounding region mapped into a radar image for selecting points in the radar image for determining at least one property of the object, in accordance with some examples.

FIG. 7 illustrates a bounding region mapped into a radar image 700 for selecting points in the radar image for determining at least one property of the object, in accordance with some examples. In some aspects, the radar image 700 corresponds to the radar information 500 in FIG. 5A and includes a single object identified by the 2D patch 524 for illustration purposes and the radar image 700 can include many objects of varying dimensions and characteristics.

The object detection output identifies a bounding region 710 that identifies pixels of the radar image that include an object, and the bounding region 710 is mapped into the locations of the radar information 500 based on the location of the pixels in the radar image and the quantization interval of the radar image. In some aspects, a neural network is trained to output a bounding region 710 to overlap the 2D patch 524. In some aspects, the bounding region 710 is aligned with the axes of the radar image and the 2D patch 524 may partially extend outside of the bounding region 710.

In some aspects, identification of points that are outside of the bounding region 710 adds complexity to the calculation. For example, using a ray casting algorithm such as a number crossing algorithm can be used to identify if each point in the detected radar information is located within the bounding region. The radar object detection system can have a limited compute budget and implementing a number crossing algorithm may not be possible within the limited compute budget. In some aspects, the parameters of the objects can be determined from the bounding region because most points of the object will overlap with the bounding region 710. In some aspects, the points of the object within the bounding region 710 are selected and the properties of the object can be determined based on a calculation (e.g., a median, a mean, a range function, a trimmed mean, etc.) of the selected points. In some aspects, a standard deviation function can be used to remove anomalous points that would impact the measurement of the object. In other aspects, edges of the object can be identified based on any suitable detection method such as ray casting, interpolation, etc.

Figure 8:
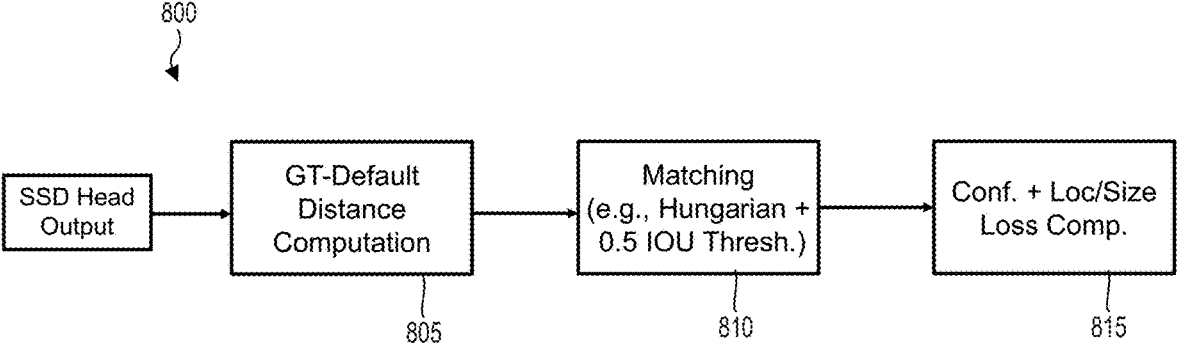
FIG. 8 is a block diagram of a classification training module for training a neural network, in accordance with some examples.

FIG. 8 is a block diagram of a classification training module for training a neural network, in accordance with some examples. In some aspects, the training module 800 receives a single shot detector (SSD) head output and computes a ground truth distance computation 805 to determine a distance to the object. A matching algorithm 810, such as a Hungarian Matching algorithm, an intersection over union (IOU) using various thresholds (e.g., a 0.5 IOU threshold, a 0.2 IOU threshold, or any other IOU threshold), or a maximum operation, is applied to the distance computation, and a confidence and localization loss module 815 computes the confidence and localization of each object.

After the confidence and localization loss module 815, the output is a number of default bounding regions (e.g., bounding boxes) that are associated with each object. An example of default bounding regions is further described herein with reference to FIG. 10. Each default bounding region can be used for a loss calculation, which increases the confidence in the prediction of the neural network. In some aspects, minority objects will have fewer default bounding regions (e.g., a single bounding region) associated with the object detection, which slows training and affects the output prediction of minority classification objects (e.g., motorcycles).

Figure 9:
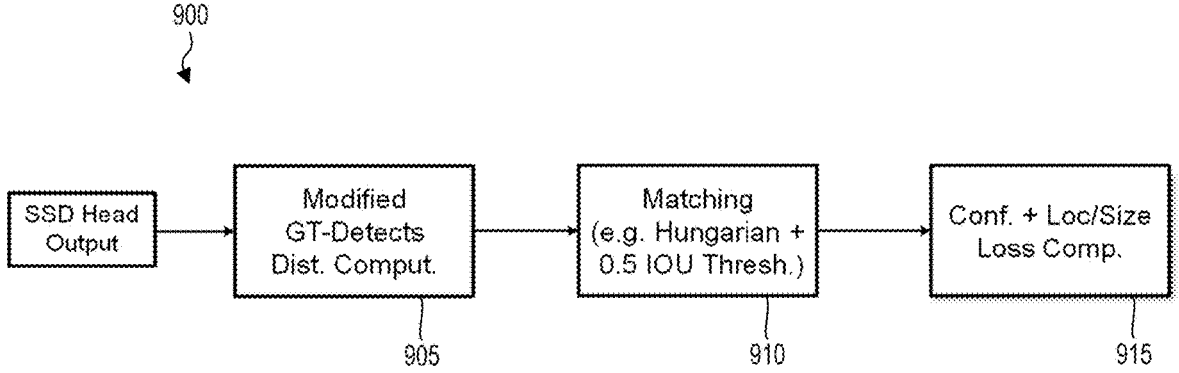
FIG. 9 is a block diagram of a classification training module for training a neural network to improve minority classification, in accordance with some examples.

FIG. 9 is a block diagram of a classification training module for training a neural network to improve minority classification, in accordance with some examples. In some aspects, the training of the neural network can be improved for minority classes, or classes of objects that appear infrequently that should be detected by the neural network. Training the neural network for minority classes is difficult and strategies to improve minority classification generally increase the size of the training dataset to improve object detection.

A classification training module 900 modifies the calculation distance to increase the number of loss computations to improve loss calculations for minority object classes. The classification training module 900 receives an SSD head output and computes a modified ground truth distance computation 905 to determine a distance to the object. In some aspects, the modified ground truth distance computation 905 can compute the distance as a function of the type of class for the detected object. For example, types of classes can be different classification of vehicles such as a motorcycle, a car, truck, a heavy truck, and so forth. A matching algorithm 910, such as a Hungarian Matching algorithm, an IOU threshold (e.g. an IOU of 0.5, an IOU of 0.2, or other IOU threshold), or a maximum operation, is applied to the distance computation, and a confidence and localization loss module 915 computes the confidence and localization of each object.

Figure 10:
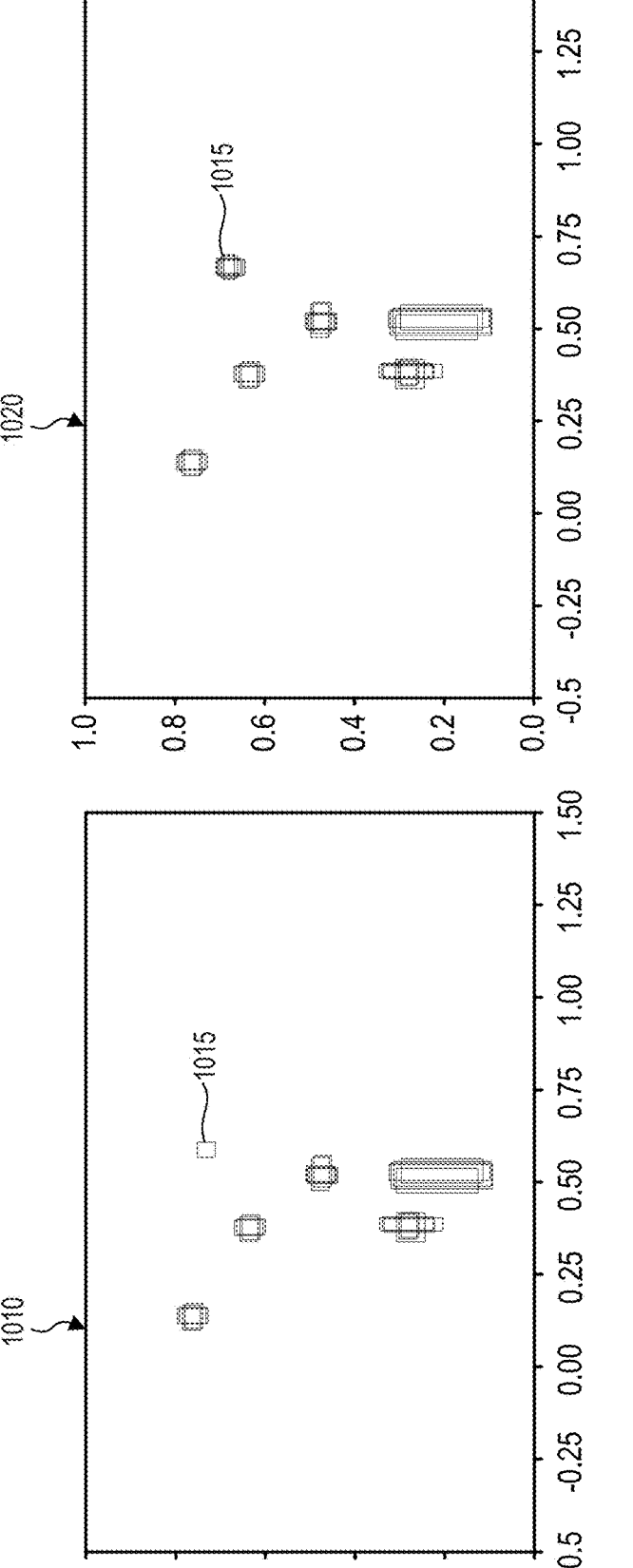
FIG. 10 is an illustration of training results associated with different classification training modules, in accordance with some examples.

FIG. 10 is an illustration of training results associated with different classification training modules, in accordance with some examples. A first image 1010 depicts a first loss calculation associated with a training process of the dataset that uses a ground truth computation to each potential object in the environment, such as the training module 800 of FIG. 8. After the loss computation, objects generally have a number of default bounding regions that can be associated with each object but a minority object 1015 in the training dataset (e.g., a motorcycle) only includes a single bounding box.

A second image 1020 depicts a second loss calculation associated with a training process of the dataset that uses a modified ground truth computation for each potential object in the environment. For example, the modified ground truth computation can use compute the distance to the object as a function of object classification, such as the classification training module 900 of FIG. 9. After the loss computation, each object in the environment, including the minority object 1015, is associated with a number of default bounding regions. In some aspects, because the minority class object will have more default bounding regions, the additional bounding regions improve training performance.

Figure 11:
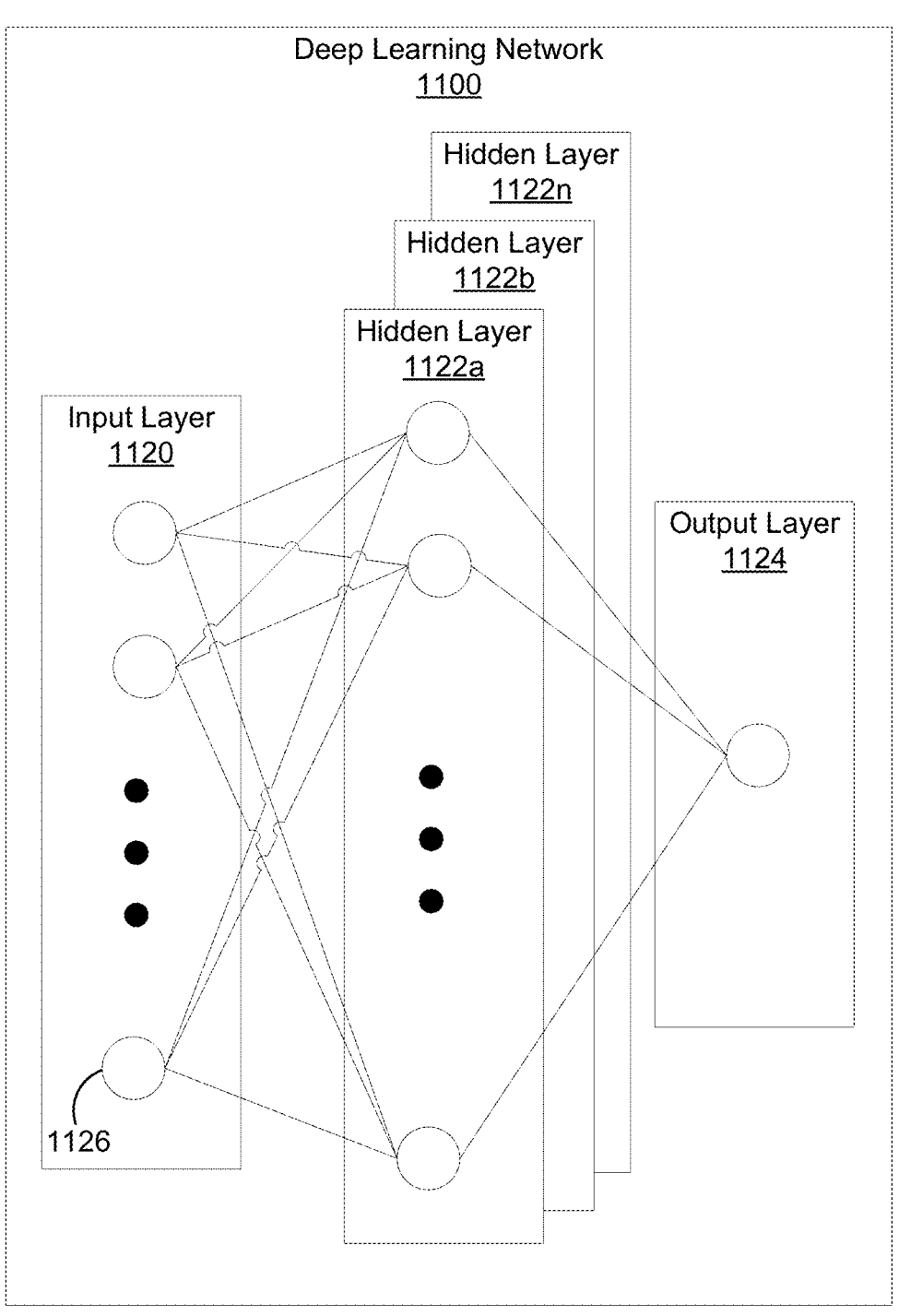
FIG. 11 is an illustrative example of a deep neural network that can be used to perform object detection on an image containing a target object, in accordance with some examples.

As noted above, the object detection and tracking system can use an ML-based object detector (e.g., based on a deep neural network) to perform object detection. FIG. 11 is an illustrative example of a deep neural network 1100 that can be used to perform object detection on an image containing a target object, such as an object detected using the 2D patch 524, as discussed above. Deep neural network 1100 includes an input layer 1120 that is configured to ingest input data, such as pre-processed (scaled) sub-images that contain a target object for which detection is to be performed. In one illustrative example, the input layer 1120 can include data representing the pixels of an input image or video frame. The neural network 1100 includes multiple hidden layers 1122a, 1122b, through 1122n. The hidden layers 1122a, 1122b, through 1122n include "n" number of hidden layers, where "n" is an integer greater than or equal to one. The number of hidden layers can be made to include as many layers as needed for the given application. The neural network 1100 further includes an output layer 1124 that provides an output resulting from the processing performed by the hidden layers 1122a, 1122b, through 1122n. In one illustrative example, the output layer 1124 can provide a classification for an object in an image or input video frame. The classification can include a class identifying the type of object (e.g., a person, a dog, a cat, or other object).

The neural network 1100 is a multi-layer neural network of interconnected nodes. Each node can represent a piece of information. Information associated with the nodes is shared among the different layers and each layer retains information as information is processed. In some cases, the neural network 1100 can include a feed-forward network, in which case there are no feedback connections where outputs of the network are fed back into itself. In some cases, the neural network 1100 can include a recurrent neural network, which can have loops that allow information to be carried across nodes while reading in input.

Information can be exchanged between nodes through node-to-node interconnections between the various layers. Nodes of the input layer 1120 can activate a set of nodes in the first hidden layer 1122a. For example, as shown, each of the input nodes of the input layer 1120 is connected to each of the nodes of the first hidden layer 1122a. The nodes of the hidden layers 1122a, 1122b, through 1122n can transform the information of each input node by applying activation functions to this information. The information derived from the transformation can then be passed to and can activate the nodes of the next hidden layer 1122b, which can perform their own designated functions. Example functions include convolutional, up-sampling, data transformation, and/or any other suitable functions. The output of the hidden layer 1122b can then activate nodes of the next hidden layer, and so on. The output of the last hidden layer 1122n can activate one or more nodes of the output layer 1124, at which an output is provided. In some cases, while nodes (e.g., node 1126) in the neural network 1100 are shown as having multiple output lines, a node has a single output and all lines shown as being output from a node represent the same output value.

In some cases, each node or interconnection between nodes can have a weight that is a set of parameters derived from the training of the neural network 1100. Once the neural network 1100 is trained, it can be referred to as a trained neural network, which can be used to classify one or more objects. For example, an interconnection between nodes can represent a piece of information learned about the interconnected nodes. The interconnection can have a tunable numeric weight that can be tuned (e.g., based on a training dataset), allowing the neural network 1100 to be adaptive to inputs and able to learn as more and more data is processed.

The neural network 1100 is pre-trained to process the features from the data in the input layer 1120 using the different hidden layers 1122a, 1122b, through 1122n in order to provide the output through the output layer 1124. In an example in which the neural network 1100 is used to identify objects in images, the neural network 1100 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 1100 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 1100 is trained well enough so that the weights of the layers are accurately tuned.

For the example of identifying objects in images, the forward pass can include passing a training image through the neural network 1100. The weights are initially randomized before the neural network 1100 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 1100, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 1100 is unable to determine low level features and thus cannot make an accurate determination of what the classification of the object might be. A loss function can be used to analyze error in the output. Any suitable loss function definition can be used. One example of a loss function includes a mean squared error (MSE). The MSE is defined as $E_{total}=\Sigma\frac{1}{2}(target-output)^2$, which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 1100 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta\frac{dL}{dW},$$

where w denotes a weight, $w_i$ denotes the initial weight, and $\eta$ denotes a learning rate. The learning rate can be set to any suitable value, with a high learning rate including larger weight updates and a lower value indicating smaller weight updates.

The neural network 1100 can include any suitable deep network. One example includes a CNN, which includes an input layer and an output layer, with multiple hidden layers between the input and out layers. The hidden layers of a CNN include a series of convolutional, nonlinear, pooling (for downsampling), and fully connected layers. The neural network 1100 can include any other deep network other than a CNN, such as an autoencoder, a deep belief nets (DBNs), a Recurrent Neural Networks (RNNs), among others.

Figure 12:
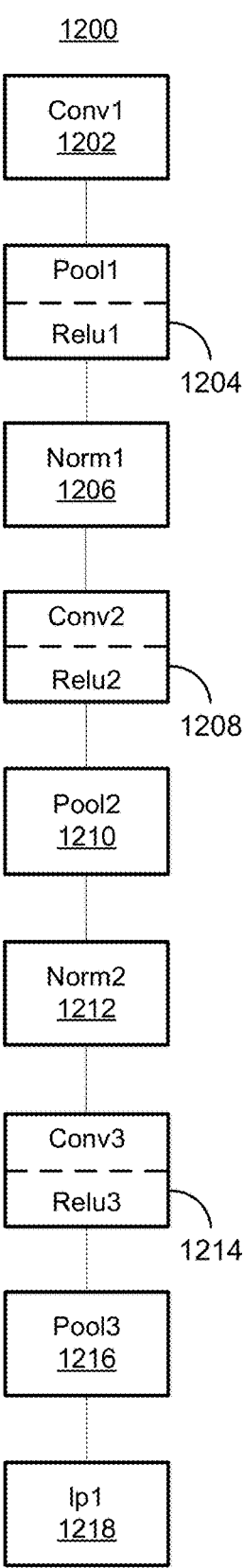
FIG. 12 is a diagram illustrating an example of a Cifar-10 neural network, in accordance with some examples.

FIG. 12 is a diagram illustrating an example of the Cifar-10 neural network 1200. In some cases, the Cifar-10 neural network can be trained to classify specific objects, such as vehicles only. As shown, the Cifar-10 neural network 1200 includes various convolutional layers (Conv1 layer 1202, Conv2/Relu2 layer 1208, and Conv3/Relu3 layer 1214), numerous pooling layers (Pool1/Relu1 layer 1204, Pool2 layer 1210, and Pool3 layer 1216), and rectified linear unit layers mixed therein. Normalization layers Norm1 1206 and Norm2 1212 are also provided. A final layer is the ip1 layer 1218.

Another deep learning-based detector that can be used to detect or classify objects in images includes the SSD detector, which is a fast single-shot object detector that can be applied for multiple object categories or classes. Traditionally, the SSD model is designed to use multi-scale convolutional bounding box outputs attached to multiple feature maps at the top of the neural network. Such a representation allows the SSD to efficiently model diverse box shapes, such as when the size of an object is unknown in a given image. However, using the systems and techniques described herein, the sub-image extraction and the width and/or height scaling of the sub-image can allow an object detection and tracking system to avoid having to work with diverse box shapes. Rather, the object detection model of the detection and tracking system can perform object detection on the scaled image in order to detect the position and/or location of the object (e.g., a target vehicle) in the image.

Figures 13A, 13B, 13C:
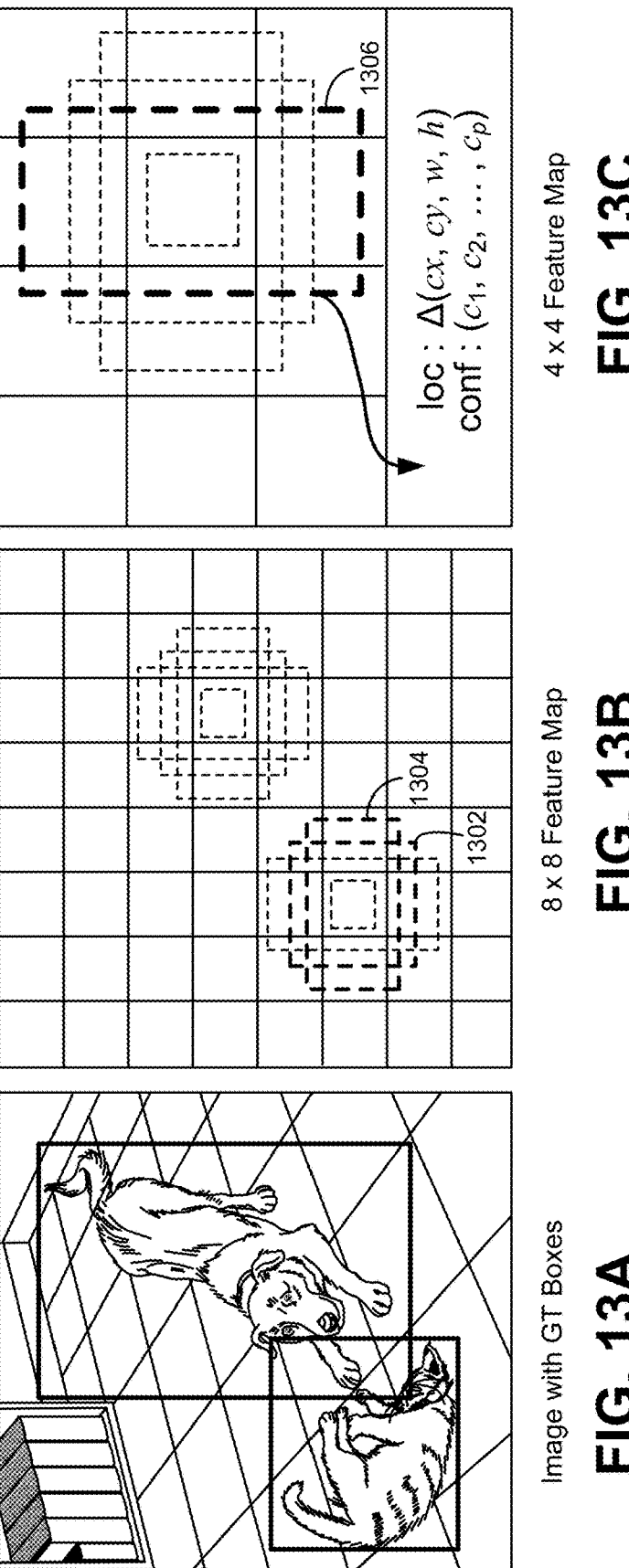
FIG. 13A through FIG. 13C are diagrams illustrating an example of a single-shot object detector, in accordance with some examples.

FIG. 13A-FIG. 13C are diagrams illustrating an example of a single-shot object detector that models diverse box shapes. FIG. 13A includes an image and FIG. 13B and FIG. 13C include diagrams illustrating how an SSD detector (with the Visual Geometry Group (VGG) deep network base model) operates. For example, SSD matches objects with default boxes of different aspect ratios (shown as dashed rectangles in FIG. 13B and FIG. 13C). Each element of the feature map has a number of default boxes associated with it. Any default box with an intersection-over-union with a ground truth box over a threshold (e.g., 0.4, 0.5, 0.6, or other suitable threshold) is considered a match for the object. For example, two of the 8×8 boxes (box 1302 and box 1304 in FIG. 13B) are matched with the cat, and one of the 4×4 boxes (box 1306 in FIG. 13C) is matched with the dog. SSD has multiple features maps, with each feature map being responsible for a different scale of objects, allowing it to identify objects across a large range of scales. For example, the boxes in the 8×8 feature map of FIG. 13B are smaller than the boxes in the 4×4 feature map of FIG. 13C. In one illustrative example, an SSD detector can have six feature maps in total.

For each default box in each cell, the SSD neural network outputs a probability vector of length c, where c is the number of classes, representing the probabilities of the box containing an object of each class. In some cases, a background class is included that indicates that there is no object in the box. The SSD network also outputs (for each default box in each cell) an offset vector with four entries containing the predicted offsets required to make the default box match the underlying object's bounding box. The vectors are given in the format (cx, cy, w, h), with cx indicating the center x, cy indicating the center y, w indicating the width offsets, and h indicating height offsets. The vectors are only meaningful if there actually is an object contained in the default box. For the image shown in FIG. 13A, all probability labels would indicate the background class with the exception of the three matched boxes (two for the cat, one for the dog).

As noted above, using the systems and techniques described herein, the number of scales is reduced to the scaled sub-image, upon which an object detection model can perform object detection to detect the position of an object (e.g., a target vehicle).

Figures 14A, 14B, 14C:
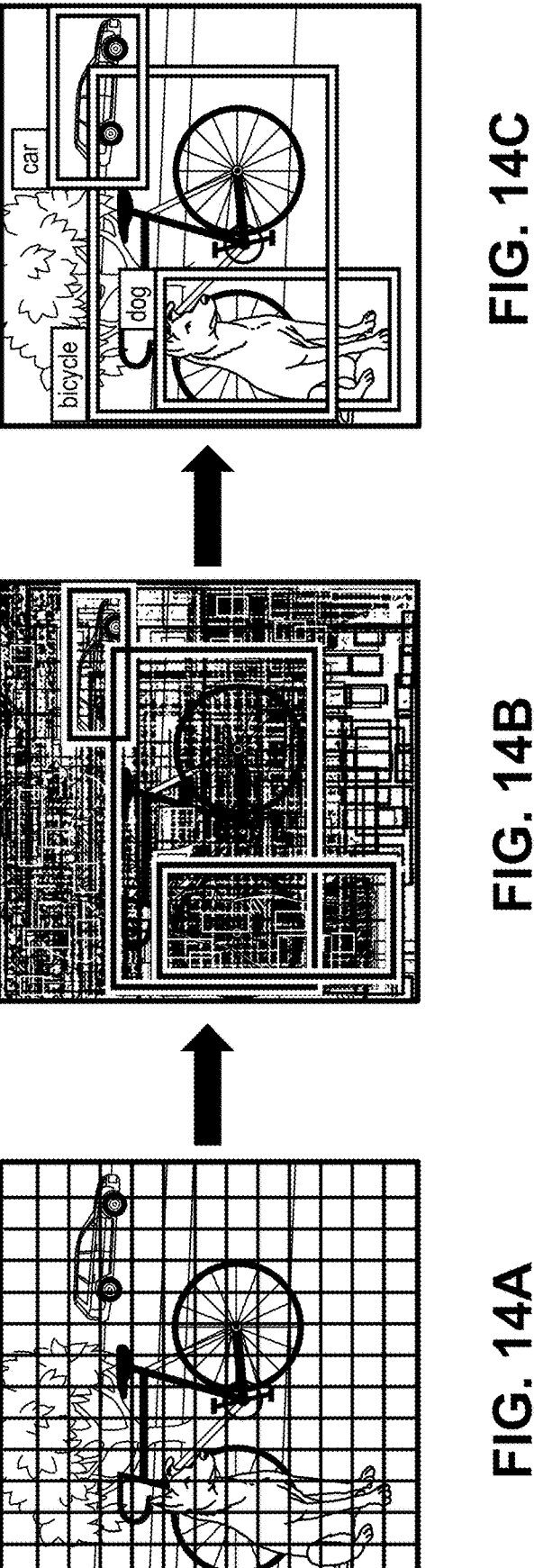
FIG. 14A through FIG. 14C are diagrams illustrating an example of a You Only Look Once (YOLO) detector, in accordance with some examples.

Another deep learning-based detector that can be used by an object detection model to detect or classify objects in images includes the You Only Look Once (YOLO) detector, which is an alternative to the SSD object detection system. FIG. 14A through FIG. 14C are diagrams illustrating an example of a YOLO detector, in accordance with some examples. In particular, FIG. 14A includes an image and FIG. 14B and FIG. 14C include diagrams illustrating how the YOLO detector operates. The YOLO detector can apply a single neural network to a full image. As shown, the YOLO network divides the image into regions and predicts bounding boxes and probabilities for each region. These bounding boxes are weighted by the predicted probabilities. For example, as shown in FIG. 14A, the YOLO detector divides the image into a grid of 13-by-13 cells. Each of the cells is responsible for predicting five bounding boxes. A confidence score is provided that indicates how certain it is that the predicted bounding box actually encloses an object. This score does not include a classification of the object that might be in the box, but indicates if the shape of the box is suitable. The predicted bounding boxes are shown in FIG. 14B. The boxes with higher confidence scores have thicker borders.

Each cell also predicts a class for each bounding box. For example, a probability distribution over all the possible classes is provided. Any number of classes can be detected, such as a bicycle, a dog, a cat, a person, a car, or other suitable object class. The confidence score for a bounding box and the class prediction are combined into a final score that indicates the probability that that bounding box contains a specific type of object. For example, the gray box with thick borders on the left side of the image in FIG. 14B is 85% sure it contains the object class "dog." There are 169 grid cells (13×13) and each cell predicts 5 bounding boxes, resulting in 1745 bounding boxes in total. Many of the bounding boxes will have very low scores, in which case only the boxes with a final score above a threshold (e.g., above a 30% probability, 40% probability, 50% probability, or other suitable threshold) are kept. FIG. 14C shows an image with the final predicted bounding boxes and classes, including a dog, a bicycle, and a car. As shown, from the 1745 total bounding boxes that were generated, only the three bounding boxes shown in FIG. 14C were kept because they had the best final scores.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces can be configured to communicate and/or receive wired and/or wireless data, including data according to the 3G, 4G, 5G, and/or other cellular standard, data according to the WiFi (802.11x)

standards, data according to the Bluetooth™ standard, data according to the Internet Protocol (IP) standard, and/or other types of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), DSPs, central processing units (CPUs), and/or other suitable electronic circuits), and/or can include and/or be implemented using computer software, firmware, or any combination thereof, to perform the various operations described herein.

Figure 15:
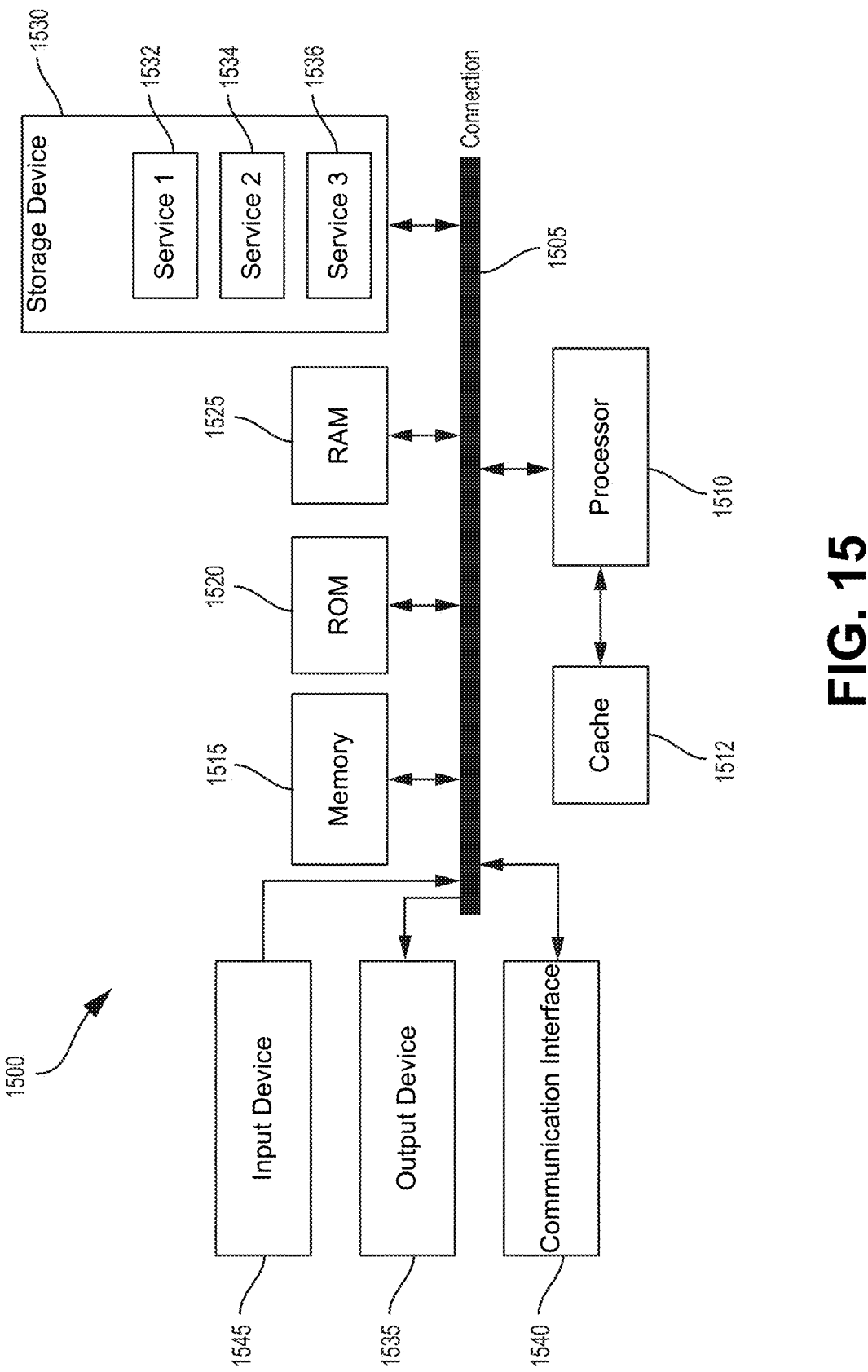
FIG. 15 is a block diagram of an exemplary computing device that may be used to implement some aspects of the technology described herein, in accordance with some examples.

FIG. 15 is a diagram illustrating an example of a system for implementing certain aspects of the present technology. In particular, FIG. 15 illustrates an example of computing system 1500, which can be for example any computing device making up internal computing system, a remote computing system, a camera, or any component thereof in which the components of the system are in communication with each other using connection 1505. Connection 1505 can be a physical connection using a bus, or a direct connection into processor 1510, such as in a chipset architecture. Connection 1505 can also be a virtual connection, networked connection, or logical connection.

In some aspects, computing system 1500 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 1500 includes at least one processing unit (CPU or processor) 1510 and connection 1505 that couples various system components including system memory 1515, such as read-only memory (ROM) 1520 and random-access memory (RAM) 1525 to processor 1510. Computing system 1500 can include a cache 1512 of high-speed memory connected directly with, in close proximity to, or integrated as part of processor 1510.

Processor 1510 can include any general-purpose processor and a hardware service or software service, such as services 1532, 1534, and 1536 stored in storage device 1530, configured to control processor 1510 as well as a special-purpose processor where software instructions are incorporated into the actual processor design. Processor 1510 may essentially be a completely self-contained computing system, containing multiple cores or processors, a bus, memory controller, cache, etc. A multi-core processor may be symmetric or asymmetric.

To enable user interaction, computing system 1500 includes an input device 1545, which can represent any number of input mechanisms, such as a microphone for speech, a touch-sensitive screen for gesture or graphical input, keyboard, mouse, motion input, speech, etc. Computing system 1500 can also include output device 1535, which can be one or more of a number of output mechanisms. In some instances, multimodal systems can enable a user to provide multiple types of input/output to communicate with computing system 1500. Computing system 1500 can include communications interface 1540, which can generally govern and manage the user input and system output.

The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 WiFi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/long term evolution (LTE) cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

The communications interface 1540 may also include one or more Global Navigation Satellite System (GNSS) receivers or transceivers that are used to determine a location of the computing system 1500 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 1530 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a Europay, Mastercard and Visa (EMV) chip, a subscriber identity module (SIM) card, a mini/micro/nano/pico SIM card, another integrated circuit (IC) chip/card, RAM, static RAM (SRAM), dynamic RAM (DRAM), ROM, programmable read-only memory (PROM), erasable programmable read-only memory (EPROM), electrically erasable programmable read-only memory (EEPROM), flash EPROM (FLASHEPROM), cache memory (L1/L2/L3/L4/L5/L #), resistive random-access memory (RRAM/ReRAM), phase change memory (PCM), spin transfer torque RAM (STT-RAM), another memory chip or cartridge, and/or a combination thereof.

The storage device 1530 can include software services, servers, services, etc., that when the code that defines such software is executed by the processor 1510, it causes the system to perform a function. In some aspects, a hardware service that performs a particular function can include the software component stored in a computer-readable medium in connection with the necessary hardware components, such as processor 1510, connection 1505, output device 1535, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as CD or DVD, flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but may have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as RAM such as synchronous dynamic random access memory (SDRAM), ROM, non-volatile random access memory (NVRAM), EEPROM, flash memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more DSPs, general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

Illustrative examples of the disclosure include:

Aspect 1: A method of detecting one or more objects, comprising: obtaining radar information identifying measured properties of at least one object in an environment; generating pre-processed radar information for input into a neural network at least in part by processing the obtained radar information; generating an object detection output for the at least one object at least in part by detecting the at least one object using the neural network with the pre-processed radar information as input; and modifying, based on the obtained radar information, the object detection output for the at least one object.

Aspect 2: The method of Aspect 1, wherein the radar information includes at least one point cloud from at least one radar.

Aspect 3: The method of any of Aspects 1 to 2, wherein the radar information includes at least one radar image.

Aspect 4: The method of any of Aspects 1 to 3, wherein each pixel of the at least one radar image includes at least one value of a property measured by the at least one radar.

Aspect 5: The method of any of Aspects 1 to 4, wherein processing the obtained radar information comprises: identifying a first set of points from the obtained radar information associated with the at least one object; and determining at least one point based on the first set of points, the first set of points and the at least one point forming a two-dimensional patch associated with the at least one object.

Aspect 6: The method of any of Aspects 1 to 5, further comprising: determining a representative value for the at least one object; identifying a first set of pixels of the at least one radar image based on the two-dimensional patch associated with the at least one object; and setting a property of the first set of pixels to the representative value.

Aspect 7: The method of any of Aspects 1 to 6, further comprising: normalizing a property of a first set of pixels in the at least one radar image.

Aspect 8: The method of any of Aspects 1 to 7, further comprising: determining a minimum value associated with the property; determining a default value based on the minimum value associated with the property; identifying pixels that do not have a value; and setting the identified pixels to the default value.

Aspect 9: The method of any of Aspects 1 to 8, wherein the property comprises at least one of an RCS value, a velocity, a yaw, or an acceleration.

Aspect 10: The method of any of Aspects 1 to 9, wherein the object detection output of the neural network comprises a bounding region that identifies a location of the at least one object.

Aspect 11: The method of any of Aspects 1 to 10, wherein modifying the object detection output comprises: determining a size of the bounding region; and modifying a classification confidence of the object detection output for the at least one object based on the determined size of the bounding region.

Aspect 12: The method of any of Aspects 1 to 11, wherein modifying the classification confidence of the object detection output includes increasing the classification confidence based on the determined size being less than a threshold size.

Aspect 13: The method of any of Aspects 1 to 12, wherein modifying the object detection output comprises: identifying a set of points in the obtained radar information based on the bounding region that identifies the location of the at least one object; and computing a representative property value for the at least one object based on measured property values of the set of points.

Aspect 14: The method of any of Aspects 1 to 13, further comprising: outputting object information of the at least one object to another component to perform a function based on the object information, the object information including the representative property value.

Aspect 15: The method of any of Aspects 1 to 14, wherein the representative property value includes a mean value of the measured property values of the set of points.

Aspect 16: The method of any of Aspects 1 to 15, wherein the representative property value includes at least one of a median value or a trimmed mean of the measured property values of the set of points.

Aspect 17: The method of any of Aspects 1 to 16, wherein computing the representative property value comprises identifying a subset of points from the set of points and determining the representative property value from the subset of points.

Aspect 18: The method of any of Aspects 1 to 17, wherein computing the representative property value comprises: determining a yaw of the at least one object; selecting a subset of points from the set of points based on the yaw of the at least one object; and determining the representative property value from the subset of points.

Aspect 19: The method of any of Aspects 1 to 18, wherein computing the representative property value comprises: determining a velocity of the at least one object; selecting a subset of points from the set of points based on the velocity of the at least one object; and determining the representative property value from the subset of points.

Aspect 20: An apparatus for detecting objects. The apparatus includes a memory (e.g., implemented in circuitry) and a processor (or multiple processors) coupled to the memory. The processor (or processors) is configured to: obtain radar information identifying measured properties of at least one object in an environment; generate pre-processed radar information for input into a neural network at least in part by processing the obtained radar information; generate an object detection output for the at least one object at least in part by detecting the at least one object using the neural network with the pre-processed radar information as input; and modifying, based on the obtained radar information, the object detection output for the at least one object.

Aspect 21: The apparatus of Aspect 20, wherein the radar information includes at least one point cloud from at least one radar.

Aspect 22: The apparatus of any of Aspects 20 to 21, wherein the radar information includes at least one radar image.

Aspect 23: The apparatus of any of Aspects 20 to 22, wherein each pixel of the at least one radar image includes at least one value of a property measured by the at least one radar.

Aspect 24: The apparatus of any of Aspects 20 to 23, wherein the processor is configured to: identify a first set of points from the obtained radar information associated with the at least one object; and determine at least one point based on the first set of points, the first set of points and the at least one point forming a two-dimensional patch associated with the at least one object.

Aspect 25: The apparatus of any of Aspects 20 to 24, wherein the processor is configured to: determine a representative value for the at least one object; identify a first set of pixels of the at least one radar image based on the two-dimensional patch associated with the at least one object; and set a property of the first set of pixels to the representative value.

Aspect 26: The apparatus of any of Aspects 20 to 25, wherein the processor is configured to: normalize a property of a first set of pixels in the at least one radar image.

Aspect 27: The apparatus of any of Aspects 20 to 26, wherein the processor is configured to: determine a minimum value associated with the property; determine a default value based on the minimum value associated with the property; identify pixels that do not have a value; and set the identified pixels to the default value.

Aspect 28: The apparatus of any of Aspects 20 to 27, wherein the property comprises at least one of an RCS value, a velocity, a yaw, or an acceleration.

Aspect 29: The apparatus of any of Aspects 20 to 28, wherein the object detection output of the neural network comprises a bounding region that identifies a location of the at least one object.

Aspect 30: The apparatus of any of Aspects 20 to 29, wherein the processor is configured to: determine a size of the bounding region; and modify a classification confidence of the object detection output for the at least one object based on the determined size of the bounding region.

Aspect 31: The apparatus of any of Aspects 20 to 30, wherein modifying the classification confidence of the object detection output includes increasing the classification confidence based on the determined size being less than a threshold size.

Aspect 32: The apparatus of any of Aspects 20 to 31, wherein the processor is configured to: identify a set of points in the obtained radar information based on the bounding region that identifies the location of the at least one object; and compute a representative property value for the at least one object based on measured property values of the set of points.

Aspect 33: The apparatus of any of Aspects 20 to 32, wherein the processor is configured to: output object information of the at least one object to another component to perform a function based on the object information, the object information including the representative property value.

Aspect 34: The apparatus of any of Aspects 20 to 33, wherein the representative property value includes a mean value of the measured property values of the set of points.

Aspect 35: The apparatus of any of Aspects 20 to 34, wherein the representative property value includes at least one of a median value or a trimmed mean of the measured property values of the set of points.

Aspect 36: The apparatus of any of Aspects 20 to 35, wherein computing the representative property value comprises identifying a subset of points from the set of points and determining the representative property value from the subset of points.

Aspect 37: The apparatus of any of Aspects 20 to 36, wherein the processor is configured to: determine a yaw of the at least one object; select a subset of points from the set of points based on the yaw of the at least one object; and determine the representative property value from the subset of points.

Aspect 38: The apparatus of any of Aspects 20 to 37, wherein the processor is configured to: determine a velocity of the at least one object; select a subset of points from the set of points based on the velocity of the at least one object; and determine the representative property value from the subset of points.

Aspect 39: A non-transitory computer-readable medium is provided that has stored thereon instructions that, when executed by one or more processors, cause the one or more processors to perform operations according to Aspects 1 to 38.

Aspect 40: An apparatus comprising one or more means for performing operations according to Aspects 1 to 38.

What is claimed is:

1. A method of detecting one or more objects, comprising:
obtaining radar information identifying measured properties of at least one object in an environment;
generating pre-processed radar information for input into a neural network;
generating an object detection output for the at least one object at least in part by detecting the at least one object using the neural network with the pre-processed radar information, wherein the object detection output of the neural network comprises a bounding region identifying a location of the at least one object;
determining that a size of the bounding region is less than a threshold size; and
modifying, based on the radar information and the size of the bounding region being less than the threshold size, a classification confidence of the object detection output for the at least one object.

2. The method of claim 1, wherein the radar information includes at least one point cloud from at least one radar.

3. The method of claim 2, wherein the radar information includes at least one radar image.

4. The method of claim 3, wherein each pixel of the at least one radar image includes at least one value of a property measured by the at least one radar.

5. The method of claim 3, wherein generating the pre-processed radar information comprises:

identifying a first set of points from the radar information associated with the at least one object; and determining at least one point based on the first set of points, the first set of points and the at least one point forming a two-dimensional patch associated with the at least one object.

6. The method of claim 5, further comprising:

determining a representative value for the at least one object;

identifying a first set of pixels of the at least one radar image based on the two- dimensional patch associated with the at least one object; and setting a property of the first set of pixels to the representative value.

7. The method of claim 6, further comprising:

determining a minimum value associated with the property;

determining a default value based on the minimum value associated with the property;

identifying pixels that do not have a value; and setting the identified pixels to the default value.

8. The method of claim 1, wherein modifying the classification confidence of the object detection output includes increasing the classification confidence based on the size being less than the threshold size.

9. The method of claim 1, wherein modifying the object detection output comprises:

identifying a set of points in the radar information based on the bounding region identifying the location of the at least one object; and computing a representative property value for the at least one object based on measured property values of the set of points.

10. The method of claim 9, further comprising:

outputting object information of the at least one object to another component to perform a function based on the object information, the object information including the representative property value.

11. The method of claim 10, wherein computing the representative property value comprises identifying a subset of points from the set of points and determining the representative property value from the subset of points.

12. The method of claim 10, wherein computing the representative property value comprises:

determining a yaw of the at least one object;

selecting a subset of points from the set of points based on the yaw of the at least one object; and determining the representative property value from the subset of points.

13. The method of claim 10, wherein computing the representative property value comprises:

determining a velocity of the at least one object;

selecting a subset of points from the set of points based on the velocity of the at least one object; and determining the representative property value from the subset of points.

14. An apparatus for detecting objects, comprising:

a memory; and one or more processors coupled to the memory and configured to:

obtain radar information identifying measured properties of at least one object in an environment;

generate pre-processed radar information for input into a neural network;

generate an object detection output for the at least one object at least in part by detecting the at least one object using the neural network with the pre-processed radar information as input, wherein the object detection output of the neural network comprises a bounding region identifying a location of the at least one object;

determine that a size of the bounding region is less than a threshold size; and modifying, based on the radar information and the size of the bounding region being less than the threshold size, a classification confidence of the object detection output for the at least one object.

15. The apparatus of claim 14, the radar information includes at least one point cloud from at least one radar.

16. The apparatus of claim 15, the radar information includes at least one radar image.

17. The apparatus of claim 16, each pixel of the at least one radar image includes at least one value of a property measured by the at least one radar.

18. The apparatus of claim 16, wherein the one or more processors are configured to:

identify a first set of points from the radar information associated with the at least one object; and determine at least one point based on the first set of points, the first set of points and the at least one point forming a two-dimensional patch associated with the at least one object.

19. The apparatus of claim 18, wherein the one or more processors are configured to:

determine a representative value for the at least one object;

identify a first set of pixels of the at least one radar image based on the two- dimensional patch associated with the at least one object; and set a property of the first set of pixels to the representative value.

20. The apparatus of claim 19, wherein the one or more processors are configured to:

determine a minimum value associated with the property;

determine a default value based on the minimum value associated with the property;

identify pixels that do not have a value; and set the identified pixels to the default value.

21. The apparatus of claim 14, modifying the classification confidence of the object detection output includes increasing the classification confidence based on the size being less than the threshold size.

22. The apparatus of claim 14, wherein the one or more processors are configured to:

identify a set of points in the radar information based on the bounding region identifying the location of the at least one object; and compute a representative property value for the at least one object based on measured property values of the set of points.

23. The apparatus of claim 22, wherein the one or more processors are configured to: output object information of the at least one object to another component to perform a function based on the object information, the object information including the representative property value.

24. The apparatus of claim 23, computing the representative property value comprises identifying a subset of points from the set of points and determining the representative property value from the subset of points.

25. The apparatus of claim 23, wherein the one or more processors are configured to:

determine a yaw of the at least one object;

select a subset of points from the set of points based on the yaw of the at least one object; and determine the representative property value from the subset of points.

26. The apparatus of claim 23, wherein the one or more processors are configured to:

determine a velocity of the at least one object;

select a subset of points from the set of points based on the velocity of the at least one object; and determine the representative property value from the subset of points.

\* \* \* \* \*